(12) United States Patent
Campbell et al.

(10) Patent No.: US 10,460,623 B2
(45) Date of Patent: Oct. 29, 2019

(54) TOOL SIMULATION SYSTEM, SIMULATION WORKPIECE, AND METHOD OF OPERATION

(71) Applicant: CWB Group—Industry Services, Milton (CA)

(72) Inventors: Ian Campbell, Milton (CA); Chun Yu, Milton (CA); Lukas Reidinger, Milton (CA)

(73) Assignee: CWB Group—Industry Services, Milton, Ontario (CA)

( * ) Notice: Subject to any disclaimer, the term of this patent is extended or adjusted under 35 U.S.C. 154(b) by 0 days.

(21) Appl. No.: 15/941,390

(22) Filed: Mar. 30, 2018

(65) Prior Publication Data

US 2019/0304338 A1    Oct. 3, 2019

(30) Foreign Application Priority Data

Mar. 27, 2018  (CA) ..................... 2999427

(51) Int. Cl.
| | |
|---|---|
| *G09B 19/24* | (2006.01) |
| *B23K 9/095* | (2006.01) |
| *G09B 19/00* | (2006.01) |
| *G09B 9/00* | (2006.01) |

(52) U.S. Cl.
CPC ............ *G09B 19/24* (2013.01); *B23K 9/0956* (2013.01); *G09B 9/00* (2013.01); *G09B 19/003* (2013.01)

(58) Field of Classification Search
CPC ........ G09B 19/24; G09B 9/00; G09B 19/003; B23K 9/0956
USPC ....................................................... 434/234
See application file for complete search history.

(56) References Cited

U.S. PATENT DOCUMENTS

| | | | |
|---|---|---|---|
| 4,124,944 A | 11/1978 | Blair | |
| 2010/0224610 A1* | 9/2010 | Wallace | B23K 9/0953 219/137 R |
| 2014/0272837 A1* | 9/2014 | Becker | G09B 19/24 434/234 |
| 2015/0154884 A1* | 6/2015 | Salsich | G09B 19/24 434/234 |

FOREIGN PATENT DOCUMENTS

FR    2827066 A1    1/2003

OTHER PUBLICATIONS

Notice of Allowance dated Nov. 23, 2018 for corresponding Canadian App. No. 2,999,427 (1 page).

(Continued)

*Primary Examiner* — Robert P Bullington

(57) ABSTRACT

A simulator system for use in simulating fabrication or construction comprises a simulation tool with a magnet mounted on a working end, a simulation workpiece comprising a substrate with an alignment location and at least one tool path indicator; and a sensor device with a corresponding alignment location and at least one magnetic sensor. When the sensor device is aligned with the simulation workpiece, the sensor device detects the moving magnetic field of the simulation tool and determines a path travelled by the tool with respect to the sensor device. The system can then determine if the path is consistent with simulation performance data, and can provide feedback accordingly. In this system, the simulation workpiece can be formed of inexpensive printed paper that is bent, curved, or folded into shape.

22 Claims, 18 Drawing Sheets

(56) References Cited

OTHER PUBLICATIONS

Canada Office Action dated Jun. 6, 2018 for corresponding Canadian App. No. 2,999,427 (4 pages).
Canada Office Action dated Jun. 14, 2018 for corresponding Canadian App. No. 2,999,427 (4 pages).
Canada Office Action dated Aug. 17, 2018 for corresponding Canadian App. No. 2,999,427 (4 pages).

* cited by examiner

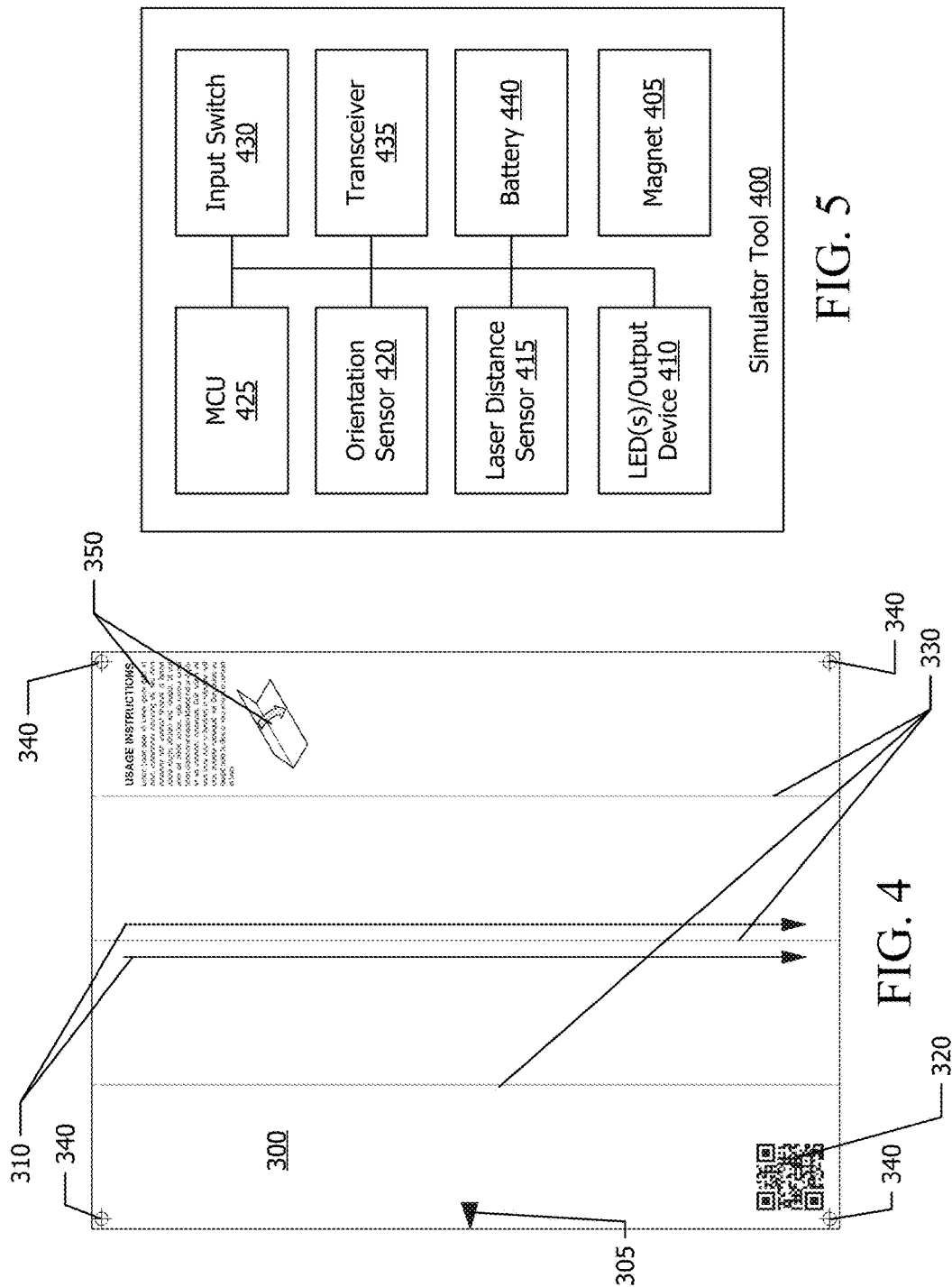

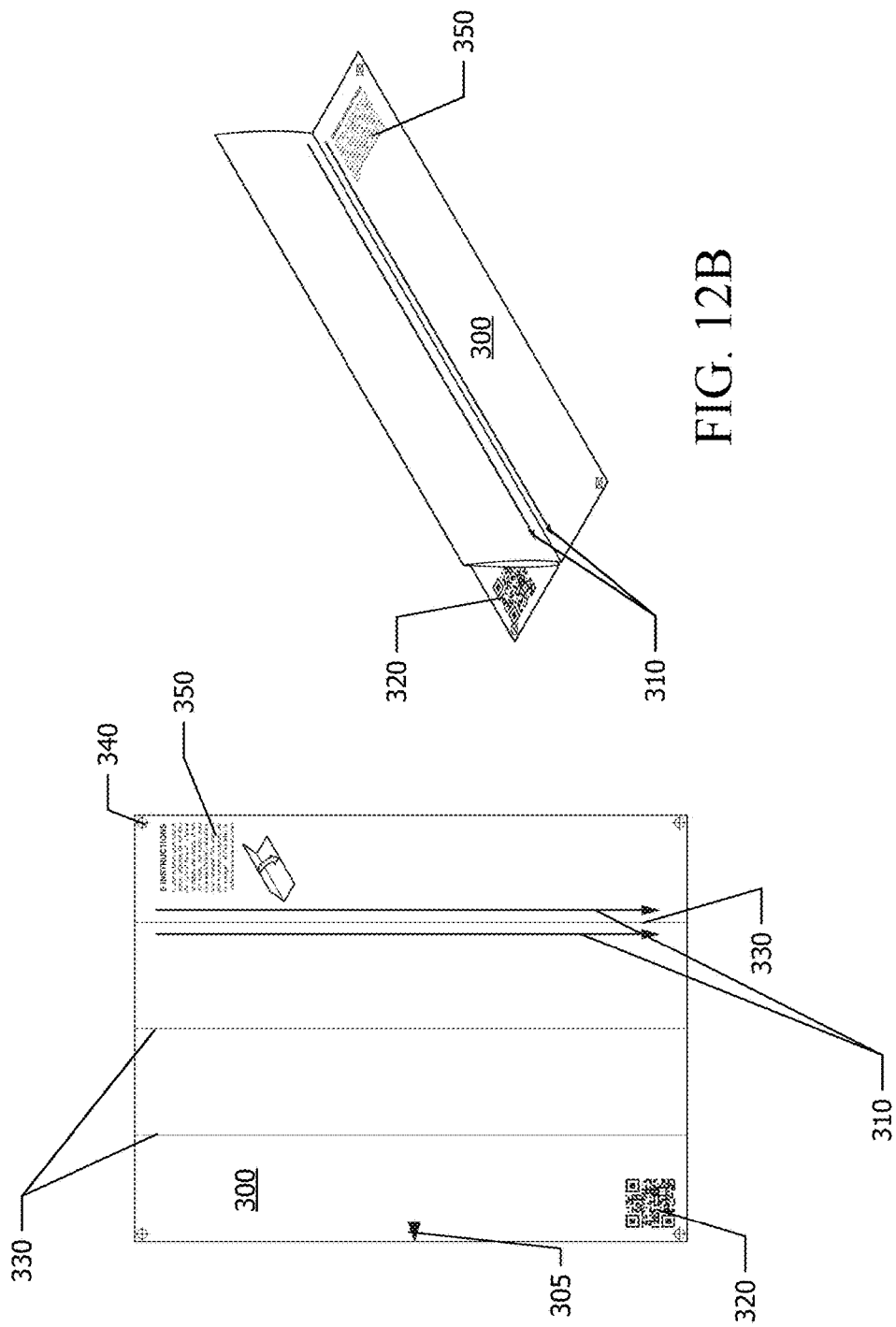

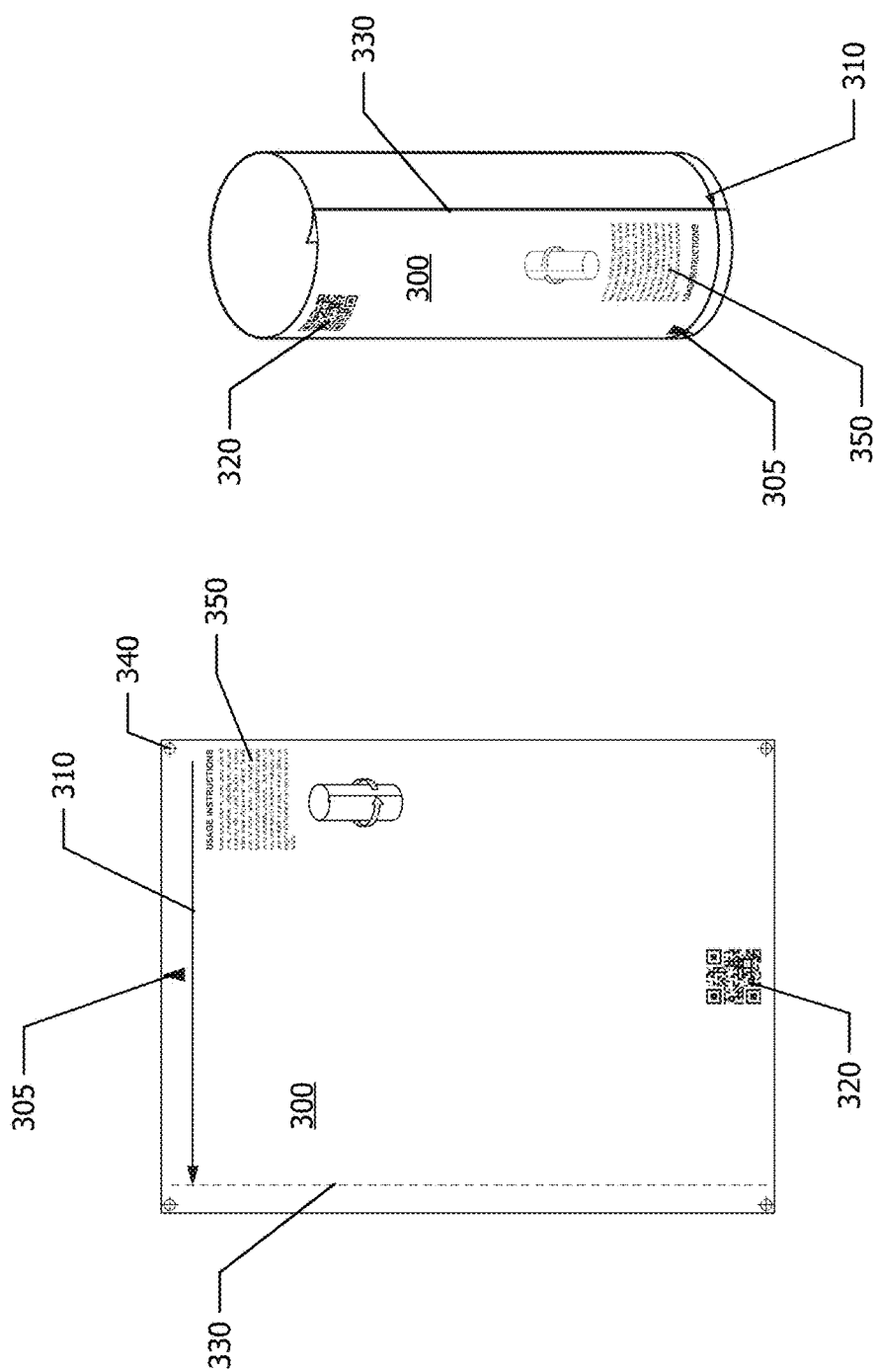

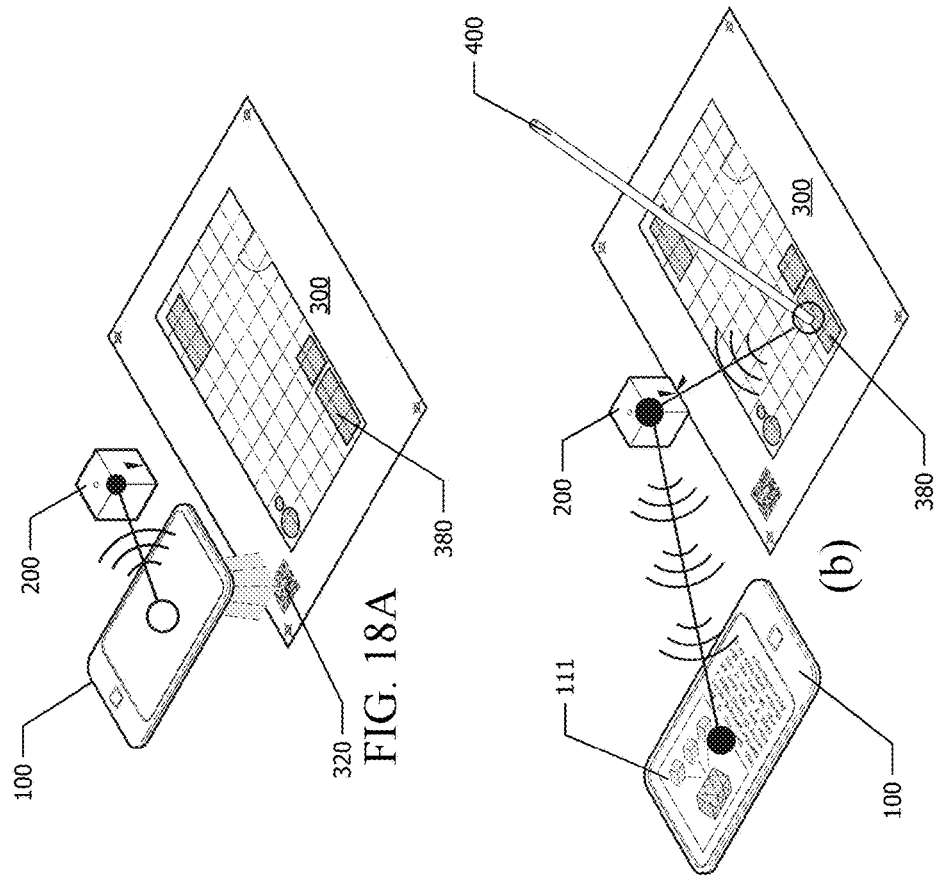

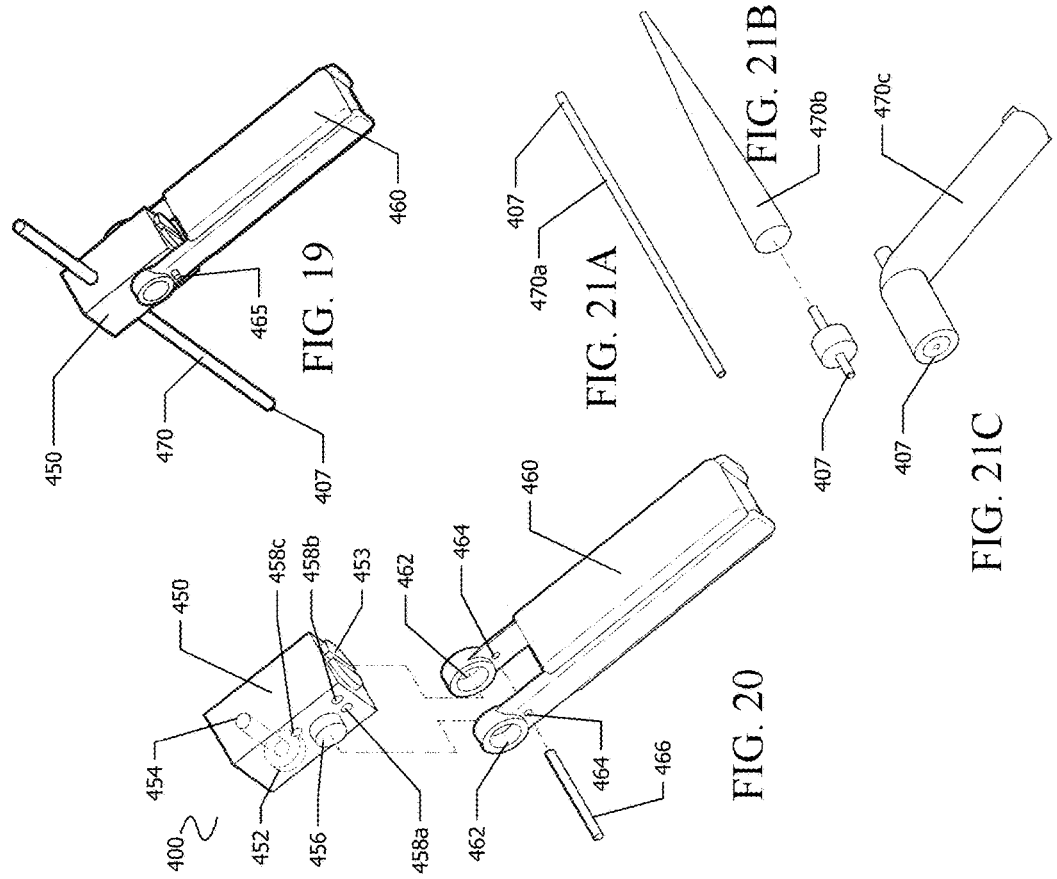

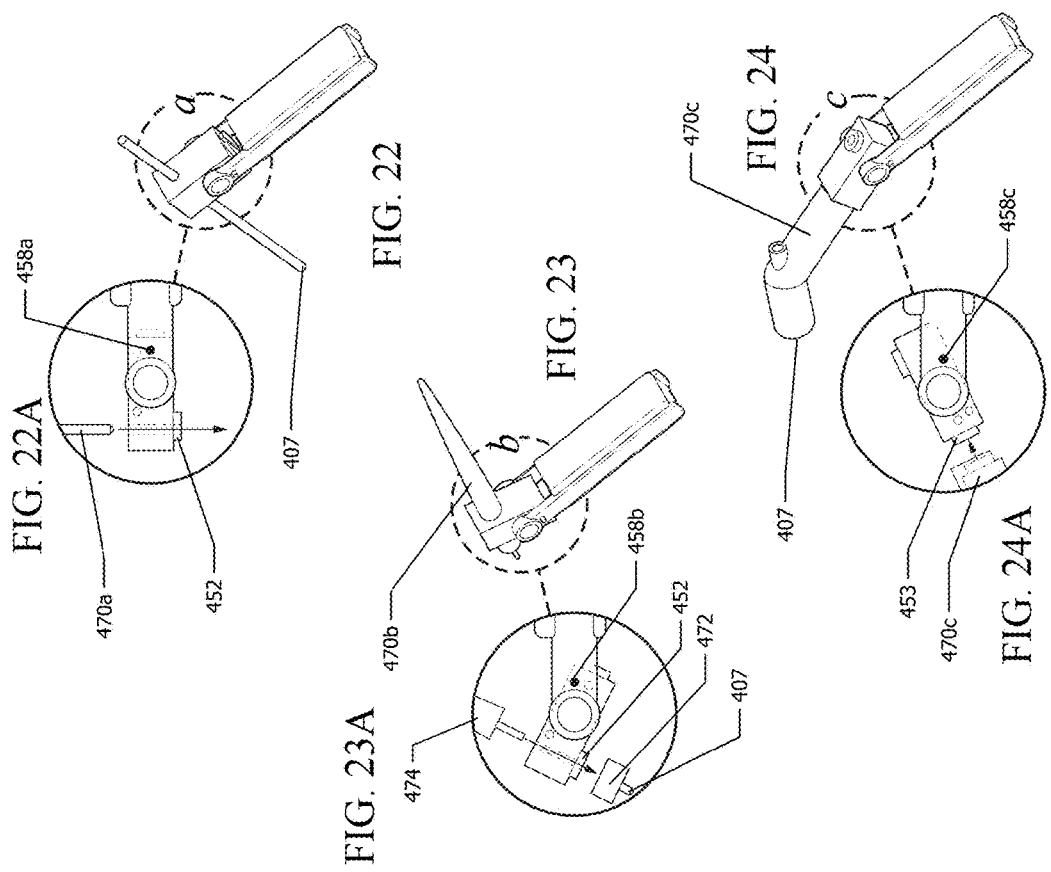

TOOL SIMULATION SYSTEM, SIMULATION WORKPIECE, AND METHOD OF OPERATION

BACKGROUND

1. Technical Field

The present disclosure relates to a multiple-component system for simulating a fabrication or construction activity, and specifically a welding simulation system, as well as a method of delivering and providing a simulation workpiece, and method of operating the simulation system.

2. Technical Background

Welding is a fabrication process that requires skills acquired through training. While welding techniques may be taught in a real-world environment, with real equipment and materials, training in this manner is costly in that it requires consumables and trained supervision. When real materials (e.g., metal samples, gas, electrodes) are used in training, errors may not be immediately detectable; a faulty weld may not be noted until the student has completed the training exercise, at which point the bad weld would need to be ground out and redone. Furthermore, training with real equipment and materials requires a suitable training environment with safety equipment, which necessitates travel by students to a central location where the training environment, equipment, materials, and supervision are located.

At least some training may be simulated, to as to reduce costs and the risk of injury to new workers. Many systems have been proposed that make use of virtual reality, computer vision, tablet computers, and the like to simulate the materials and chemical and physical changes involved in welding, without the need for active participation by an instructor. While these complicated systems may provide useful feedback to the trainee concerning their performance, these systems are also somewhat cost prohibitive in that they require significant investment in specialized equipment; and due to their cost and/or the size of the training equipment, they may not be suited to classroom or remote training. Feedback from these simulation systems is typically provided post-exercise, with the result that the student must learn to correct bad practice after completing the exercise; put another way, in order to complete a proper weld in an exercise, the student must already know in advance how to perform a proper weld. Typical virtual reality systems are thus sub-optimal for teaching fabrication processes.

BRIEF DESCRIPTION OF THE DRAWINGS

In drawings which illustrate by way of example only embodiments of the present application.

FIG. 4 is an illustration of an example simulation workpiece with use with the simulation system of FIG. 1.

FIG. 5 is a block diagram of select components of a simulator tool for use with the simulation system of FIG. 1.

FIGS. 12A and 12B illustrate a second example welding simulation workpiece in a plan view and assembled perspective view, respectively.

FIGS. 13A and 13B illustrate a third example welding simulation workpiece in a plan view and assembled perspective view, respectively.

FIGS. 17A and 17B, and FIGS. 18A and 18B, are schematics illustrating the loading of further content using the sensor device and a user communication device.

FIGS. 19, 20, and 21A, 21B, and 21C illustrate components of a multi-mode simulation tool for use with the system of FIG. 1.

FIGS. 22 and 22A, FIGS. 23 and 23A, and FIGS. 24 and 24A illustrate assembly of the multi-mode simulation tool using different welding tool accessories in perspective and detail views.

DETAILED DESCRIPTION

The embodiments and examples described herein provide a simplified welding or fabrication simulation system, method, sensor device, tool, and simulated workpiece that can be used to provide effective training by simulation, so as to reduce the amount of time that must be spent in practice with real materials and equipment. This solution makes use of lower-cost components to track the user's operation of a simulation tool in a system that is portable and inexpensive to operate. Moreover, the system can make use of easily fabricated and disposable—and recyclable—paper simulation workpieces that can even be distributed electronically and printed at the user's location. Various embodiments of the system also provide an improved environment for online or remote learning.

Figure 1:
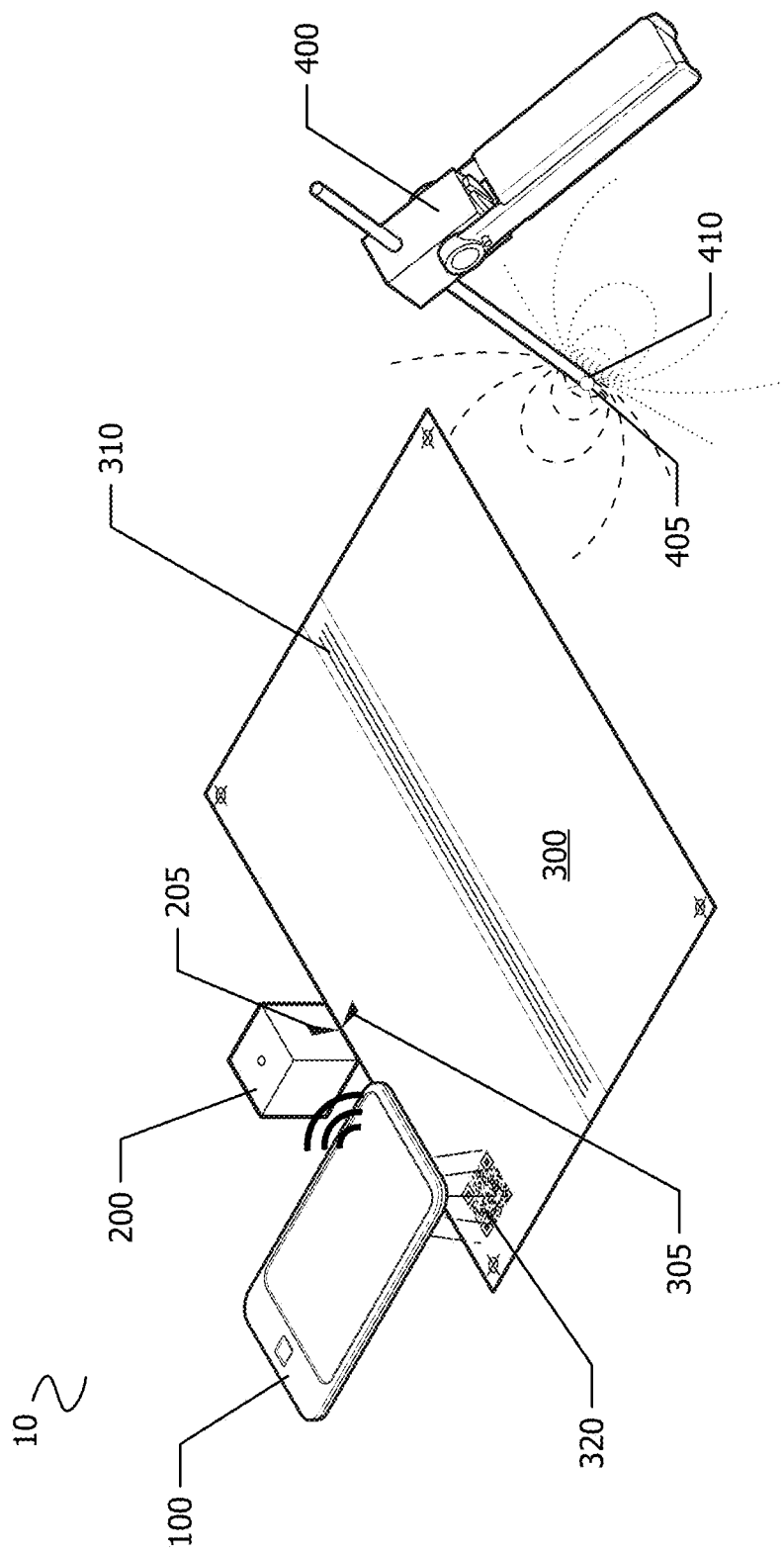
FIG. 1 is a schematic of a simulation system.

FIG. 1 provides an overview of the simulation system 10. In the principal embodiment described herein, a sensor device 200 is aligned with a simulation workpiece 300. The sensor device 200 may be a device small enough to be held in the hand, easily transportable and positionable on any convenient surface. The simulation workpiece 300 may be formed of paper, and may be printed with indicia indicating a tool path to be followed by a simulation tool, as well as other indicia usable to identify and load simulation information. The user may use their own communication device 100—such as a smartphone—to read the identifying indicia 320 and retrieve the simulation information, and to send the simulation information to the sensor device. The sensor device 200 is aligned with the workpiece 300 using corresponding alignment indicators 205, 305, and detects movement of a simulation tool 400 that is provided with a magnet generating a magnetic field. The simulation tool 400, in some embodiments, is configurable in different forms corresponding to different types of welding tools.

Figure 2:
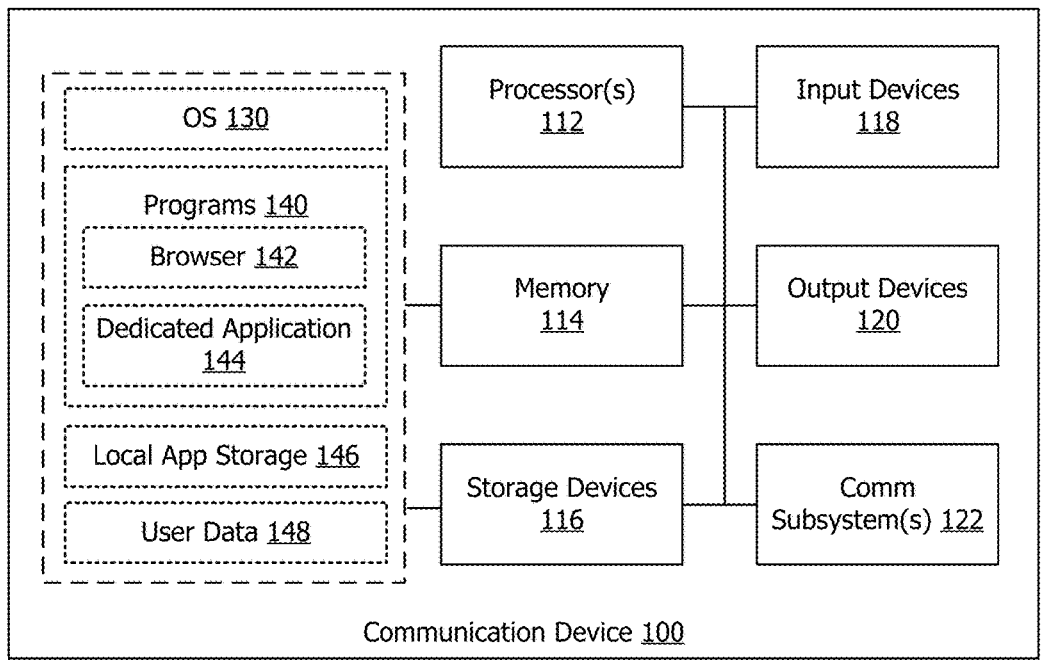
FIG. 2 is a block diagram of select components of a user communication device usable with the simulation system of FIG. 1.

FIG. 2 is a block diagram illustrating selected components of a typical user communication device 100, such as a smartphone, tablet, laptop computer, or other computing device, which may be used in the system 10 depicted in FIG. 1. As will be explained below, some functions of the user communication device 100 may be integrated with the sensor device 200; if the user communication device is equipped with suitable sensors, it may fill the role of the sensor device 200, or else the sensor device 200 may be equipped with the necessary components to fulfil the role of the user communication device 100. However, by leveraging the communication capabilities of the user communication device 100—such devices 100 being commonly available—reduces the number of communication and input components required in the sensor device 200, thus reducing the cost of the sensor device 200.

The example user communication device 100 depicted in the accompanying drawings is illustrated as a smartphone; however, it will be understood by those skilled in the art that this is not intended to be limiting, and the systems and methods described herein may be implemented using any suitable computing device that is configurable to operate as described, whether or not this device is primarily intended for communication or other types of uses.

Referring to FIG. 2, operation of the communication device 100 is generally controlled by a main processor or processors 112. The communication device 100 may be operated under mains power or may be a battery-powered device, not shown. Data, programs, and other instructions or information can be stored in one of several possible memory components of the communication device 100, such as internal memory 114 (which can include standard volatile and non-volatile memory components, which can be integrated with other components such as the processor 112 or provided as distinct components). Information can also be stored in the system 100 on other storage devices 116, either internal or external, such as hard drives, flash drives, memory cards, and peripheral devices. Typically, software and data components such as the operating system (OS) 130, programs (applications) 140, locally stored application data 146, and user data 148 are stored in resident persistent memory. In some communication devices, some components of the OS 130 may be embedded as firmware in integrated memory in the processor 112. However, portions of such components may be temporarily loaded into volatile memory. In this example, the programs 140 can include, among others, a general-purpose user agent such as a web browser application 142. Additionally or alternatively, a dedicated application 144 may be provided to implement the examples described here. Implementation using a browser 142 provides, among other advantages, improved mobility and portability on the part of users, who may be able to use the simulation system 10 using different communication devices, provided they are equipped with a standard browser application 142. who may be distributed globally or across a wide geographic area.

The communication device 100 is provided with user or sensor input devices 118. User input devices can include a touch and/or pointing device, such as a touchscreen, touchpad, mouse, or trackball; a keyboard; security peripherals such as a biometric scanner; and multimedia input devices, such as cameras or microphones. The communication device 100 may also have environmental or contextual input devices such as an orientation or inertial navigation sensor, ambient light sensor, or a global positioning system (GPS) or other location detection module. The device 100 can also include a camera and/or other sensor mechanism that is adaptable for reading or sensing machine-readable indicia, such as barcodes, near-field communication (NFC) or radiofrequency (RF) tags. As will be seen in the examples described below, the communication device 100 is used to read a barcode, and specifically a QR code in the illustrated examples, to obtain data about simulation exercises; this can be achieved using a camera to capture the barcode image, and associated software or firmware configured to recognize and decode the captured image.

The communication device 100 can also include one or more output devices 120, including in particular a display screen, which may be integrated in the casing of the communication device 100, or else provided as a peripheral device. Whether or not it has an integrated display screen, the communication device 100 may be configured to output data to an external monitor or panel, tablet, television screen, projector, or virtual retinal display, via a data port or transmitter, such as a Bluetooth® or Wi-Fi® transceiver, USB port, HDMI port, DVI port, and the like. The data port or transmitter may be one of the communication subsystems 122 illustrated in FIG. 2. Graphics data to be delivered to the display screen is either processed by the processor 112, or else by a dedicated graphics processing unit, not included in FIG. 2. Other output devices include speakers, and haptics modules. Not all these suggested input or output devices are required, and many may be omitted.

Communication functions, comprising at least data and optionally voice communications, are performed through one or more communication subsystems 122 in communication with the processor 112. Other functional components used to accomplish communication functions, such as antennae, decoders, oscillators, digital signal processors, and the like, may be considered to be part of these subsystems. Wireless communication subsystems are used to exchange data with wireless networks or other wireless devices in accordance with one or more communications standards, over short ranges and wider ranges, including, without limitation, wireless LAN (e.g., one or more of the 802.11™ family of standards), Bluetooth®, CDMA and/or GSM/GPRS networks, third-generation (3G) standards such as EDGE, HSPA, HSPA+, EVDO and UMTS, and fourth-generation (4G) standards such as LTE and LTE Advanced, fifth-generation standards under consideration, and the like. The particular design of a communication subsystem is dependent on the communication network or protocol with which it is intended to operate. The communication subsystems 122 may include adaptors for use with wired connections as well.

It will be understood by those skilled in the art that the components illustrated in FIG. 2 are merely representative of particular aspects of the communication device 100, and that other components that are typically included in such a device have been excluded in the drawings and this description only for succinctness. Furthermore, those skilled in the art will understand that the communication device 100 may be successfully used with the various examples described herein even when some components described in relation to FIG. 2 are omitted.

Figure 3:
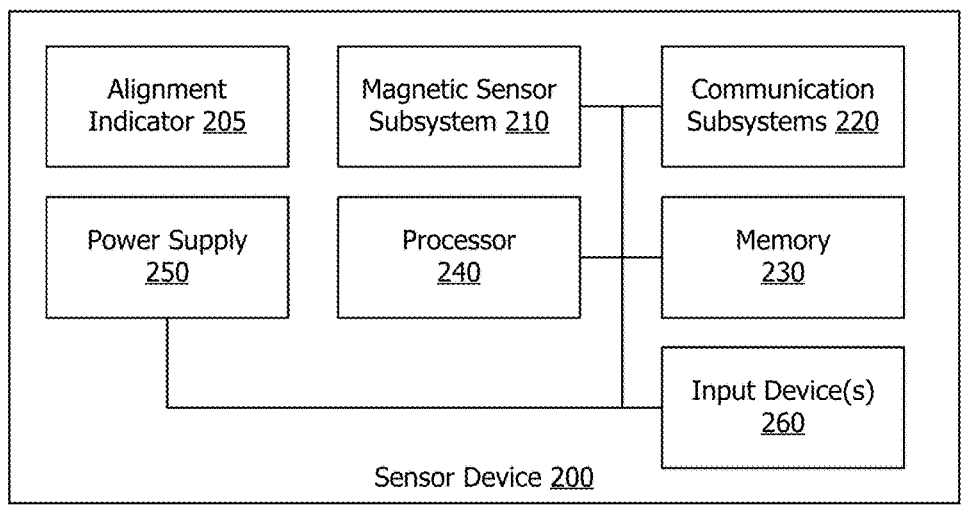
FIG. 3 is a block diagram of select components of a sensor device usable with the simulation system of FIG. 1

FIG. 3 is a block diagram illustrating select components of the sensor device 200 for use in the simulation system 10. The sensor device 200 is provided with a magnetic sensor subsystem 210 for detecting a magnetic field emitted by the simulation tool 400. Different magnetic sensor arrangements are capable of detecting and measuring different values with respect to a target magnet: a simpler, one-dimensional sensor arrangement can be used to detect a magnetic field and determine a linear distance from the magnet creating the field, whereas more robust arrangements can determine relative positioning in two or three dimensions, as well as a relative orientation of an object with a magnetic target. Example magnetic sensor arrangements are described in Chen et al., "Finexus: Tracking precise motions of multiple fingertips using magnetic sensing", Proceedings of the 2016 CHI Conference on Human Factors in Computing Systems. ACM, 2016 and Gao et al., "Localization of Ferromagnetic Target with Three Magnetic Sensors in the Movement Considering Angular Rotation", Sensors 2017, 17, 2079. In a simpler implementation, the magnetic sensor subsystem 210 is used to measure a one-dimensional distance from the simulation tool 400, and uses these values in combination with orientation information and distance-to-workpiece information received from the simulation tool 400 via a communication subsystem 220. In a more complex implementation, additional dimensions, and optionally relative orientation of the simulation tool, may be detected by the magnetic sensor subsystem 210, which may eliminate the need for additional positional or orientation data to be provided by the simulation tool 400.

The communication subsystem 220 is preferably a wireless communication subsystem operable over at least a short distance, such as a Bluetooth® transceiver, for communicating with the communication device 100 (which must therefore be similarly provisioned to communicate using the same protocol) and with the simulation tool 400. It is not necessary that the same communication subsystem be used to communicate with both the simulation tool 400 and the communication device 100. For example, communication between the communication device 100 and the sensor device 200—which may be required only when initializing a simulation, and when the resultant exercise data is to be collected for post-simulation evaluation—may be effected by a wired connection (e.g., a Universal Serial Bus (USB) connection) between the two devices, whereas communication between the sensor device 200 and the simulation tool 400, which occurs during performance of a simulation exercise, takes place over a wireless connection. Alternatively, communication between the sensor device 200 and the communication device 100 can use different wireless protocols. However, it will be appreciated that the sensor device 200 can be manufactured at lower cost if the number of communication subsystems is reduced. Furthermore, if positional or orientation data is not transmitted by the simulation tool 400 to the sensor device 200, there may be no need to include a communications subsystem dedicated to communication with the simulation tool 400, or at least receiving data from the communication tool. However, even if the sensor device 200 does not receive positional or orientation data from the simulation tool 400, depending on the particular implementation, the sensor device 200 may still transmit feedback signals to the simulation tool 400 as described below, therefore requiring at least a transmitter for transmitting the feedback signals to the simulation tool 400.

The sensor device 200 further includes memory 230 and a processor 240. In the embodiments described herein, the sensor device receives and at least temporarily stores data received from the simulation tool 400 and from the communication device 100, and processes the data received from the simulation tool 400 in order to evaluate performance of a simulation exercise in real time. In addition, some processing of the raw values detected by the magnetic sensor subsystem may be required. Thus, some processing capability is required; however, as those skilled in the art will understand, the processor 240 and memory 230 may be integrated with one or more of the communication subsystems 220 and magnetic sensor subsystem 210, as some commercially available subsystems 220 and 210 may be available as system-on-chip or system-in-package configurations. Thus, while these various components are illustrated in FIG. 3 as distinct components, it will be appreciated that the physical components providing the described functionality may not be packaged or built separately.

The sensor device 200 includes a power source 250, which again, may be a battery; and optionally a user input device or devices, such as a physical switch or button, used to power the sensor device on or off, and/or initiate pairing of the device as required with the communication device 100 and simulation tool 400.

Because this depicted embodiment of the simulation system 10 contemplates that the network communication functions of the communication device 100 will be leveraged in order to load the sensor device with required data, and to store and forward simulation exercise results to an instructor or other location, the sensor device 200 itself lacks robust communications subsystems, with the exception of the contemplated shorter-range communication system for communicating with the simulation tool 400—if required— and with the communication device 100. However, as mentioned above, the sensor device 200 in other embodiments may be equipped with additional components and functionality described with respect to the communication device 100 above, in which case it may be equipped with longer-range communication subsystems.

FIG. 3 also depicts the alignment indicator 205 provided on the sensor device 200. As will be understood from the description herein, the alignment indicator 205 is not operably connected to the other functional systems of the sensor device 200, such as the processor 240 or magnetic sensor subsystem 210, and thus FIG. 3 depicts the alignment indicator 205 in association with, but not in operable communication with, the other functional components. Rather, the alignment indicator 205 can be marked on an exterior of the sensor device 200 where it is usable as an alignment guide by the user, to align the sensor device 200 as required with the simulation workpiece 300. This alignment provides a predefined positional relationship between the sensor device 200 and the simulation workpiece 300. In some implementations, the alignment indicator 205 may be provided using different means that are operably connected to the other components of the sensor device 200. For example, the alignment indicator 205 may be displayed on a graphics display provided on the exterior of the sensor device 200 (not shown), which is controlled by the processor 240.

Alternatively, a predefined positional relationship may be provided by aligning each of the sensor device 200 and the simulation workpiece 300 against an external reference. For example, each of the sensor device 200 and simulation workpiece 300 may be placed in defined positions on a tray or platform; of course, the use of the alignment indicator 205 and a corresponding indicator 305 of the simulation workpiece 300 avoids the need for an additional system component. In yet another implementation, the positional relationship may be defined prior to the exercise, but programmatically rather than mechanically. The sensor device 200 can detect positions of the simulation tool 400 in contact with alignment indicators on the simulation workpiece 300 as part of the initialization of a simulation exercise. For example, the simulation workpiece 300 may be provided with at least two alignment indicators 305 positioned a predefined distance apart. On detecting the relative position of the simulation tool 400 at each of the alignment indicators 305, based on simulation information (described below) including the distance between the alignment indicators 305, the sensor device 200 can then apply a positional offset to the data it subsequently collects on the path travelled by the tool 400 when an exercise is carried out. In this manner the alignment indicators 305 still provide for an alignment between the simulation tool 400 and the workpiece 300.

FIG. 4 illustrates an example simulation workpiece 300, in an "unassembled" or flat form. The example simulation workpiece 300 illustrated in FIG. 4 is also shown in FIG. 12 in assembled, or "shaped", form. The simulation workpiece 300, as discussed further below, can be produced using common printer or copier paper, thus facilitating distribution and reducing the cost of the simulation system 10. Briefly, the simulation workpiece 300 includes at least an alignment location 305, which is used to align the workpiece 300 with the sensor device 200, and at least one tool path indicator 310, which guides the user during a simulation exercise. In the case of a welding simulation, the tool path indicator 310 is a welding path indicator that indicates the path to be followed by the working tip (i.e., electrode) of a simulated welding tool during the simulation exercise. The indicator 310 may therefore include an arrowhead or other indicator to indicate the direction of welding to be followed once the simulation workpiece 300 is constructed in its final form. In the example illustrated in FIG. 4, the tool path indicator 310 is an unbroken line segment; but as will be appreciated from the example of FIG. 13, the tool path indicator 310 may form a continuous path once the simulation workpiece 300 is assembled. In other variants not illustrated, a tool path indicator 310 may be set of broken line segments which, once the simulation workpiece 300 is assembled, present an unbroken line segment or continuous path. In other words, the simulation workpiece 300 may be provided to the user in a flat form; the user may construct the workpiece 300 when desired.

The simulation workpiece 300 may also include an association indicium or multiple indicia 320. These indicia are readable by the communication device 100, or by the sensor device 200 (if it is so equipped) to provide at least an identifier usable by a device in the simulation system 10 to identify a simulation exercise, and to facilitate retrieval of simulation performance data associated with that exercise. For example, the indicium 320 may be a barcode; as illustrated in the accompanying drawings, the indicium is a Quick Response (QR) code, which may encode a uniform resource locator (URL) that can be read by the communication device 100 and used to redirect a browser application 142 executing on the communication device 100 to a desired address hosted at a remote location (e.g., remote system 15) to retrieve the simulation information, or used by a dedicated program 144 to retrieve the simulation information from the address. In some implementations, the required simulation performance data may be encoded in the barcode or indicium, so that it is not necessary for the communication device 100 to retrieve the simulation information from a remote location; instead, the communication device 100 can obtain the required information from the indicium itself. This may require selection of an appropriate printable encoding technology (e.g., two-dimensional barcode) with sufficient capacity to store the required information. Alternatively, a dedicated program 144 may include the simulation information, in which case the indicium 320 may be used by the dedicated program 144 to determine what simulation information should be retrieved from memory.

In a welding simulation, the relevant simulation information may include a welding tool type (e.g., shielded metal arc (or "stick") welding (SMAW), gas tungsten arc welding (GTAW), or gas metal arc welding (GMAW), etc.); a welding exercise type (e.g., flat joint, pipe joint, etc.); a welding speed (i.e., the speed at which the welding tool should be moved); a material identifier (steel, aluminum, nickel, iron, alloys, etc.); an optional temperature value (i.e., the assumed welding temperature in the simulation); path information, which defines the path to be followed by the welding tool; and tolerances (i.e., the level of precision required in the exercise). Not all of this simulation information may be provided in the indicium 320 or by the remote system 15 or dedicated program 144. For example, a welding speed or temperature may be determined from an identification of the material.

The path information may be an expression of the tool path indicator 310 on the simulation workpiece 300 when it is in its shaped, assembled form, and may be expressed formulaically as a curve, or as a series of points starting at an origin position. More preferably the path information defines the path in 3D space followed by the simulation tool 400. In the embodiments described here, the simulation tool 400 includes a magnet producing a magnetic field; thus, the path information may comprise a set of magnetic vector values and a corresponding orientation of the tool 400 on the weld path. To create the path information, a set of measurements of the magnetic field generated by the magnet may be taken by the sensor device 200 while a properly configured simulation tool 400 is moved along the weld path at the appropriate speed. Several sets of these measurements may be taken, and averaged, to reduce any noise due to human or environment factors while the readings are taken. The measurements, or average measurements, may be stored in an N×3 matrix, where N is the number of points for which data is stored. If, during an exercise, higher resolution is required when tracking the simulation tool 400, intermediate points may be interpolated from the stored points.

Depending on the particular shape of the simulation workpiece 300, the workpiece may include assembly indicators 330, which define the final shape of the workpiece 300 when assembled. These indicators may be any appropriate guideline. They may be foldlines, as in the example of FIG. 4; they may be abutment or overlap guides, for example if the workpiece 300 is to take the shape of a tube, or if one part of the workpiece 300 is to be attached to another part; they may be cut lines, if the workpiece 300 is to be cut into a different shape. If the final shape of the workpiece is flat, there may be no assembly indicators 330 at all.

The simulation workpiece 300 also includes one or more calibration points 340, which may be used to assist in calibrating the simulation tool 400 and the sensor device 200. In the illustrated examples, four calibration points 340 are available, although a different number may be used. In some implementations, distinct calibration points 340 may be omitted; if calibration is necessary, the beginning or end of the tool path indicator 310, or some other indicia printed on the workpiece 300, may be used.

The simulation workpiece 300 can also include optional instructional content 350, which may include graphic or photographic content as well as text content. Instructional content 350 can include assembly instructions for the simulation workpiece. Additional or ancillary content 360, not shown in FIG. 4, may also be provided in conjunction with the simulation workpiece 300.

FIG. 5 illustrates select components of an example simulation tool 400. As mentioned above, depending on the type of magnetic sensor subsystem employed by the sensor device 200, positional and/or orientation data may be generated and transmitted by the simulation tool 400, or not. The functional components depicted in FIG. 5 include the sensors that may be used to generate this additional information, but it will be understood by those skilled in the art that one or more of these sensors may be eliminated depending on the selected implementation of the simulation system 10.

The simulation tool 400 may include an LED or other output device 410—such as a haptic feedback device or a speaker—for presenting feedback to the user in response to feedback signals received from the sensor device 200. If the simulation tool 400 is also required to provide data to the sensor device 200, it may be provisioned with one or more of a laser distance sensor 415 and an orientation sensor 420. The laser distance sensor 415 may be positioned near a working tip of the tool 400 in order to measure the distance between the working tip and the workpiece. The orientation sensor 420 may be provided in or on any convenient location of the simulation tool 400. Data from the laser distance sensor 415 and/or orientation sensor 420 is transmitted to the sensor device using a wireless transmitter. If the simulation device 400 is configured to receive feedback signals from the sensor device 200, the simulation tool 400 must also include a receiver. These communication components are represented by the transceiver block 435; but again, it will be appreciated that if transmission and/or receiving capability is not required on the simulation tool 400, then one or more of these functions may be omitted from the tool 400, and the transceiver may be replaced by a transmitter or receiver, or eliminated altogether. The simulation tool 400 may also include a microcontroller unit 425, which controls operations on the tool 400. As mentioned above, some functional components may be available as systems-on-chip or systems-in-package.

The simulation tool 400 includes a power source, which in this example is a battery 440, and may also include an input switch or other user input, such as a button, used to power the simulation tool 400 on or off, and/or initiate pairing of the device as required with the sensor device 200.

FIG. 5 also includes the magnet 405 provided on the tool 400, which provides the magnetic field for detection by the sensor device 200. This magnet 405 is depicted as a separately functioning component, independent of the other functional components of the simulation tool 400. However, in some implementations, the magnet may be an electromagnet controlled by the microcontroller unit 425 and/or the input switch 430, and powered by the same power source as the other components of the tool 400.

As discussed below, the simulation tool 400 may be a multifunction tool, which is capable of being configured for use in different modes according to the different types of welding tools available.

Figure 6:
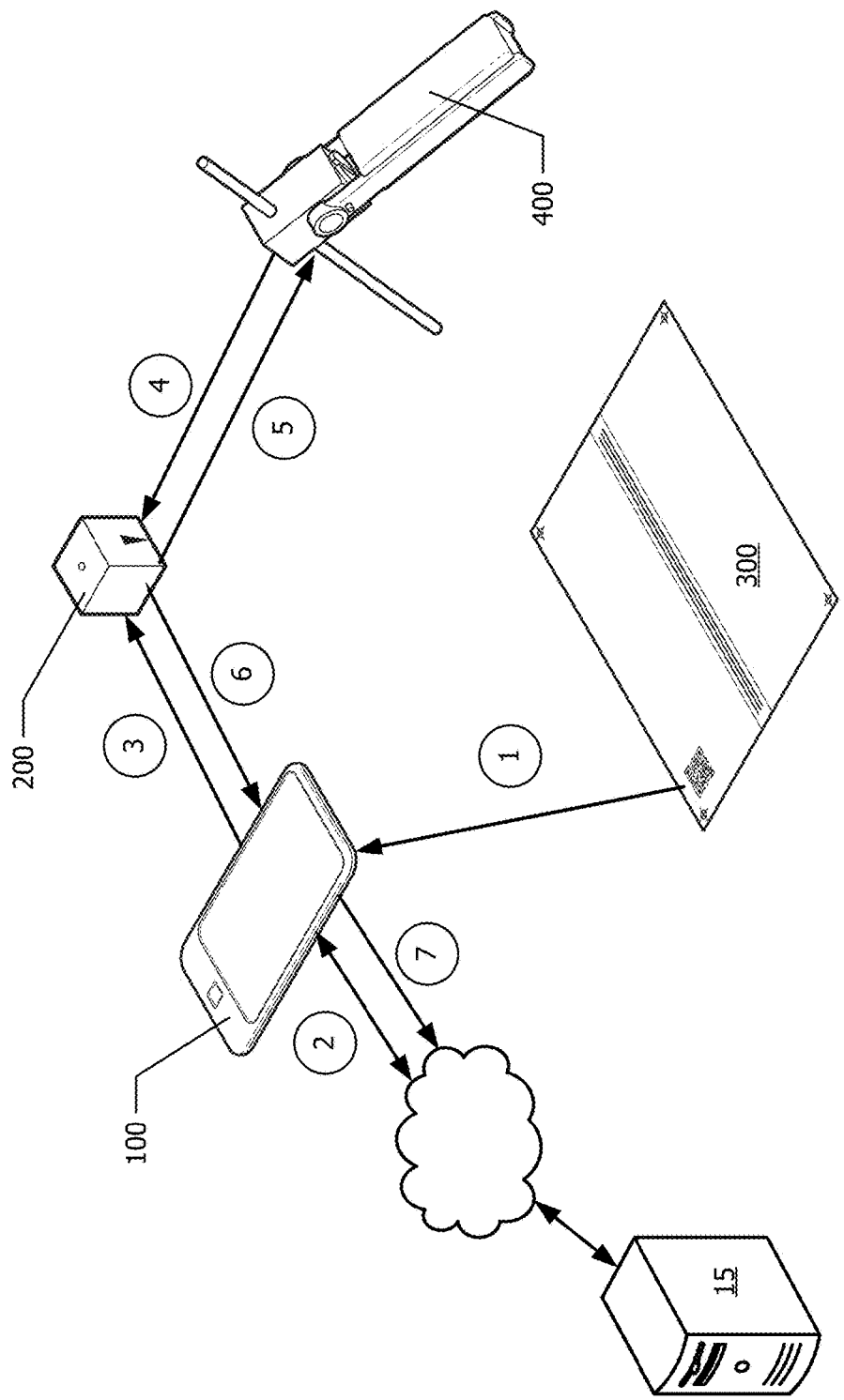
FIG. 6 is a schematic depicting a high-level overview of a simulation process using the system of FIG. 1.

Turning to FIG. 6, at a high level the operation of the simulation system may follow a number of data transfer or detection steps. First, once the simulation workpiece 300 is assembled—or before assembly—the system is configured for the selected simulation exercise represented by the workpiece 300. This can be accomplished by the communication device 100 reading the machine-readable indicium or indicia 320 provided on the workpiece 300. Next, using the data contained in the indicium 320, the communication device requests of and receives from a remote computer system 15, such as a web server or application server, the simulation information pertinent to the selected simulation exercise. Third, the communication device 100 sends the simulation information to the sensor device 200, once the communication device 100 and sensor device 200 are paired, if required. Fourth, once the simulation tool 400 and the sensor device 200 are paired, if required, the sensor device 200 detects the magnetic field emanating from the simulation tool 400, and if positional and/or orientation information is generated by the tool, this data is sent from the tool 400 to the sensor device 200. Fifth, the sensor device generates and transmits a feedback signal to the simulation tool 400, for the simulation tool to present to the user. When the simulation exercise is complete, the sensor device 200 may next transmit the simulation performance data obtained by the sensor device during the exercise to the communication device 100; finally, the communication device 100 may transmit the data to the same remote system 15, or to another remote system, for storage and/or evaluation. Some variations of this high-level workflow are discussed in relation to FIGS. 14 to 16.

Figure 7:
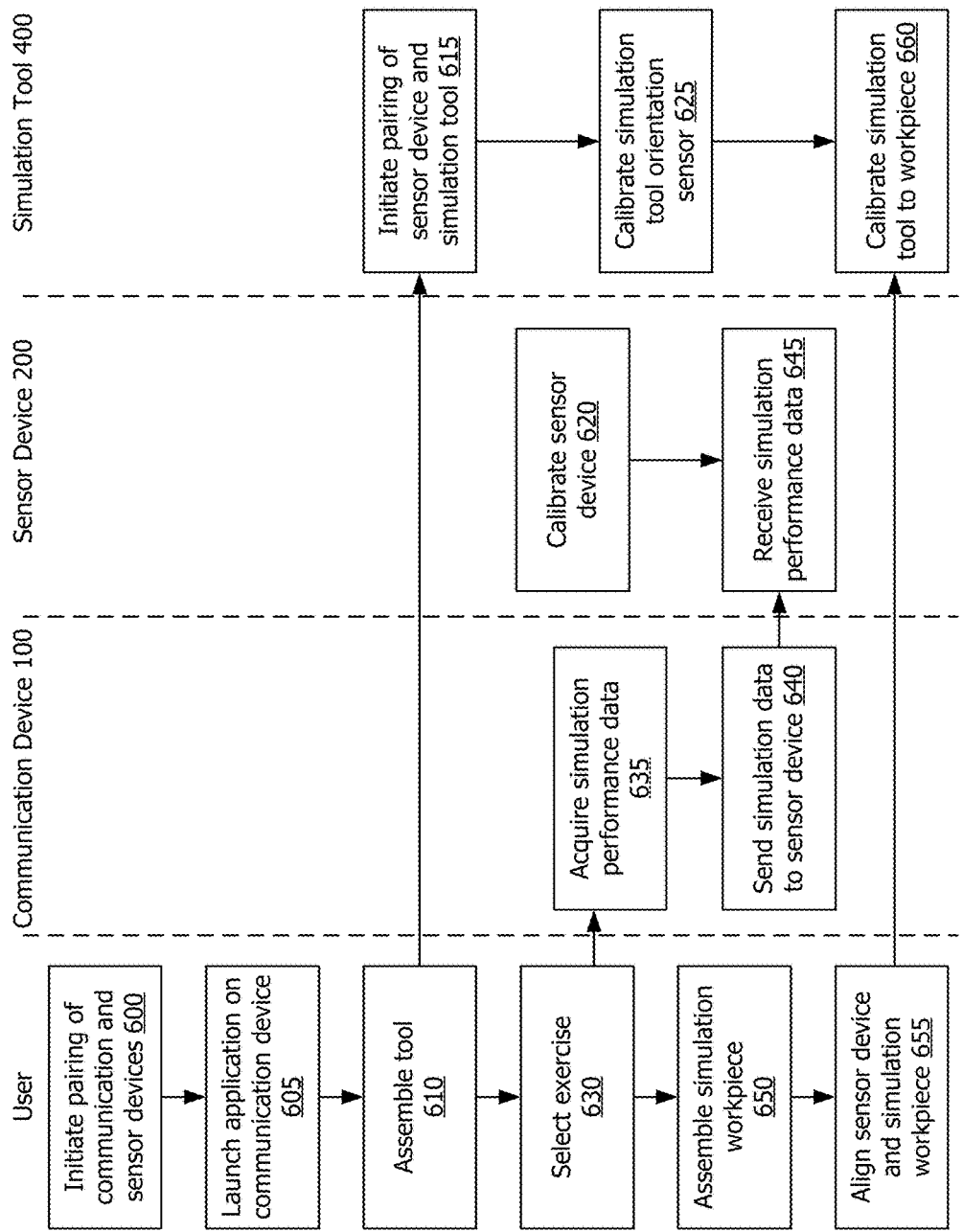
FIG. 7 is a flowchart showing a possible initiation procedure for the system of FIG. 1.

FIG. 7 illustrates the workflow during initiation of a simulation exercise using the depicted simulation system 10. At 600 a user may initiate pairing of the communication device 100 and the sensor device 200, then launch the dedicated application 144 (if there is one) or a browser application 142 at 605. The simulation tool 400 is then assembled at 610, if assembly is required, and paired with the sensor device 200 at 615. As noted above, pairing may not be required if there is no wireless communication between the sensor device 200 or the simulation tool 400. Pairing may also not be required if the communications protocol employed between the two devices does not require pairing.

At 620 and 625, the sensor device 200 and the simulation tool 400 are calibrated, as required. Calibration of the sensor device 400 may be required to calibrate the magnetic sensor subsystem 210 against the Earth's magnetic field and other magnetic fields in the environment. The sensor device 200 may include a LED or other output device to signal when it is calibrated and/or paired with other devices, or ready to start a simulation exercise (not shown in the drawings). The simulation tool 400 may require calibration if it has sensor devices requiring calibration, such as a laser distance sensor 415 and/or an orientation sensor 420. Calibration of the orientation sensor 420 may require rotation of the simulation tool 400 in the user's hand.

At 630, a simulation exercise is selected by the user. This selection may include operating the communication device 100 to read an indicium 320 on the simulation workpiece 300, as discussed above, or by communication of a selection of an exercise from the simulation tool 400 to the sensor device 200 At 635 the communication device 100 then acquires the simulation information from the remote system 15, or retrieves the information from its own memory, as the case may be, and sends the simulation information to the sensor device 100 at 640. The sensor device 200 receives this information at 645.

At 650, the user assembles the simulation workpiece 300 as required to produce a shaped simulation workpiece, and aligns the shaped workpiece with the sensor device at 655 using their corresponding alignment indicators 205, 305. Once these components are aligned, the simulation tool 400 is calibrated with the sensor device 400 using the workpiece 300 at 660 if required, by moving the sensor device 200 to defined locations, for example the calibration marks 340 on the simulation workpiece 300, while the sensor device 200 detects the magnetic field emanating from the tool magnet 405 and measures the relative distances from these calibration marks 340. In some implementations, calibration marks 340 are not used; instead, the user moves the tool 400 to the starting point of the of the weld path 310, at which point a reading is taken by the sensor device 200 and compared with the stored path information for that starting point. A difference between the stored magnetic vector information and the measured magnetic vector indicates an offset, likely due to the effect of the Earth's magnetic field and immediate environment. This offset is stored by the sensor device 200 and applied to the detected magnetic field from the tool 400 as the tool 400 is moved during the exercise. Once these initiation steps are completed, a simulation exercise may be commenced.

It will be understood by those skilled in the art that the steps depicted herein may be followed out of the illustrated order. For example, pairing of the communication and sensor devices 600 may follow assembly of the tool at 610 or the workpiece at 650; pairing of the sensor device 200 and simulation tool 615 may follow calibration of the sensor device 200 or receipt of the simulation information at 645, and so on, although some steps must logically and/or physically follow others.

Figure 8:
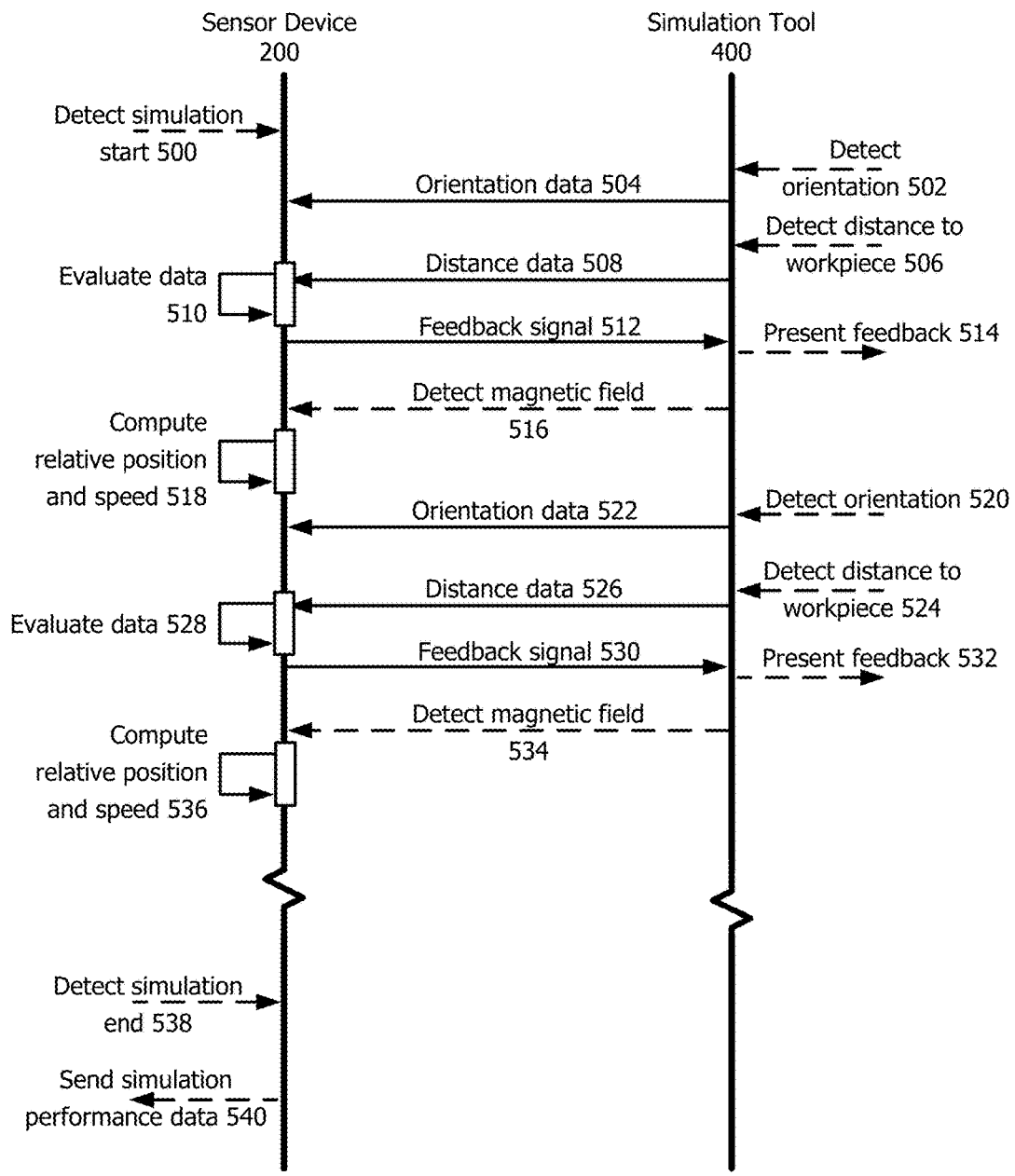
FIG. 8 is a sequence diagram illustrating a possible simulation exercise using the system of FIG. 1.

In an implementation of the sensor device 200 and simulation tool 400 in which the simulation tool 400 provides positional and orientation data to the sensor device 200, the performance of a simulation exercise may follow the sequence illustrated in FIG. 8. At 500, the sensor device 200 detects the start of a simulation exercise. This start may be an automatic determination based on a prior action by the user; for example, if the last action by the user was to calibrate the simulation tool 400 and the sensor device 200, upon completion of the calibration steps the sensor device 200 may enter a ready state to begin receiving simulation performance data. In other implementations, the user may trigger the start of the simulation exercise, for example by pressing a button or switch on the simulation tool 400, which initiates a signal to be sent to the sensor device 200.

However the start of the exercise is signaled, the sensor device 200 then enters a mode of repeatedly taking measurements using its magnetic sensor subsystem and receiving orientation and distance readings from the simulation tool 400. The orientation data is generated by the orientation sensor 420 on the tool 400 at 502, and sent to the sensor device at 504. The distance sensor 415 furthermore detects a distance from the tool 400 to the workpiece at 506, and transmits this data to the sensor device 200 at 508. The sensor device 200 receives uses the received orientation and distance data to determine whether the tool 400 is being maintained in the appropriate orientation and distance from the workpiece at 510. Based on this information, a feedback signal may be sent back to the simulation tool 400 indicating whether the user requires adjustment or not, at 512. The feedback signal is processed and presented to the user by the tool 400 at 514. Because the orientation and distance data received from the tool 400 can be processed relatively quickly, near-instantaneous feedback can be returned to the user.

The magnetic sensor subsystem also measures the magnetic field from the tool at 516, and at 518 computes a relative position and speed of the tool 400 with respect to the sensor device 200, using an internal clock (provided in the processor unit 240). Because the workpiece 300 and the sensor device 200 are aligned, the calculation of the relative position and speed of the tool 400 can be compared to the defined tool path information loaded into the sensor device 200, to determine whether the user's movements are within established parameters for the welding exercise. For example, accuracy can be evaluated by determining the difference between the measured position of the tool 400 and the target position specified by the path information for the exercise; thus, a difference of zero represents 100% accuracy. The simulation information may include an acceptable accuracy level for the exercise. While this accuracy determination may be used to generate feedback for the user as described above, this accuracy information may be generated after completion of the exercise for review by the user and instructor.

In some implementations, the simulation exercise may be performed by the user subject to progressively higher required accuracy levels. For example, the exercise may consist of multiple attempts of the same welding path. Initially, the simulation information may specify a first accuracy level, and feedback is determined and provided to the user accordingly. Once the user has successfully completed the path a predetermined number of times, as may be specified by the exercise, a second accuracy level is applied for the next attempt, and so on. The simulation information may define an exercise as having been successfully completed once the system determines that the user has successfully completed the path with a specified accuracy level a predetermined number of times.

This process can then repeat with orientation data being collected 520 and sent 522 to the sensor device 200; the distance data being read 524 and sent to the sensor device 200 at 526; feedback being determined 528 and transmitted 530 to the tool 400, and presented to the user 532; the magnetic field being measured 534 and the relative position and speed of the tool being computed again at 536. These steps can repeat until the end of the simulation is detected at 538, for example when the sensor device determines that the path has been completed, or else when the user initiates another triggering signal, for example by pressing a button at the tool 400. The sensor device 200 may then at 540 send the simulation performance data collected or processed during the simulation exercise to the communication device 100. The simulation performance data that is sent to the communication device 100 may include the raw data received by the sensor device 200, or else processed information such as the computed path of the simulation tool 400 during the exercise and whether the path was within defined tolerances.

Figure 9:
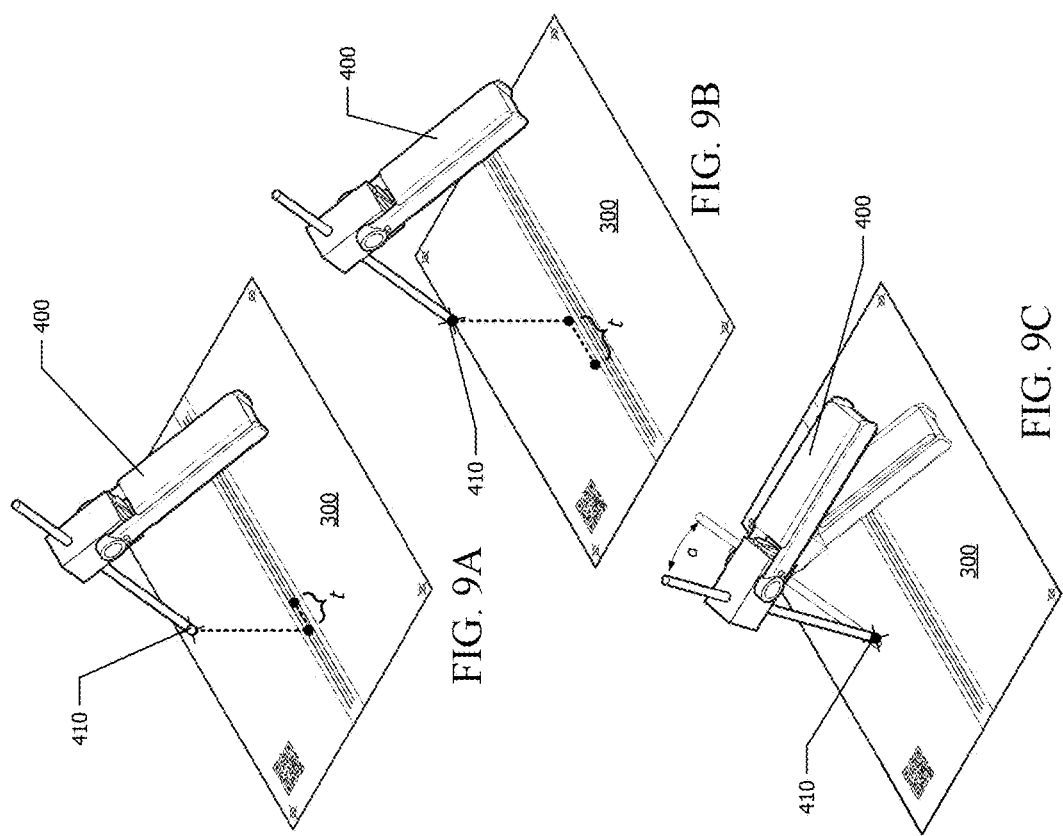
FIGS. 9A, 9B, and 9C are illustrations of different feedback conditions during a simulation exercise.

Feedback may be presented at the simulation tool 400 by a light emitting diode 410 or other visual signaling device, as illustrated in FIGS. 9A, 9B, and 9C. Feedback may include a "caution" signal indicating that the user is moving the tool too fast or too slow for the weld. For example, as long as the tool is moved at a speed and is held at an angle within acceptable parameters, the feedback signal sent to the tool 400 may result in a green light (FIG. 9A). However, if the user moves the tool 400 faster or slower than required, upon determination of an inappropriate speed the feedback signal may result in a different coloured light (FIG. 9B), which may indicate to the user what corrective action to take. In addition, if the sensor device 200 determines that the angle at which the tool is held is incorrect, and adjustment is required, the feedback signal may result in yet a different light signal (FIG. 9C) being displayed at the tool 400. Because the feedback is provided on the tool 400 while the exercise is being attempted, the user receives a real time indication whether their movements are accurate or not, and is able to make a correction (e.g., by changing the speed of movement or the angle of approach) while the exercise is still being performed. In particular, when the visual signaling device is positioned at or near the working tip of the simulation tool 400, the user receives immediate feedback since the working tip is typically at or near the location of the tool and/or workpiece under observation by the user. The system can thus provide feedback during an exercise, even if an instructor is not present. This real time feedback provides an advantage over other automated or over virtual reality training systems that only provide feedback after completion of an exercise.

Figure 10:
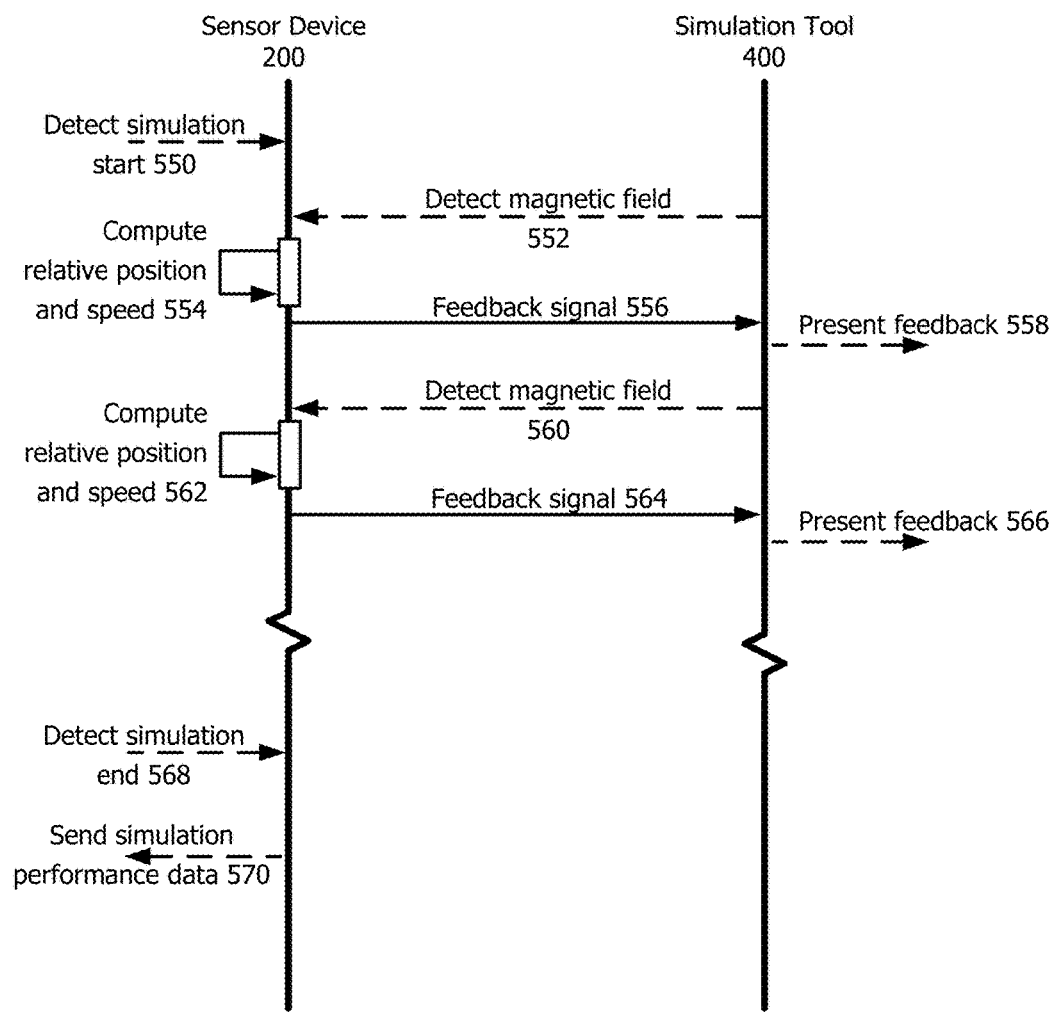
FIG. 10 is a sequence diagram illustrating a further possible simulation exercise with a different embodiment of the sensor device and simulation tool in the system of FIG. 1.

If the sensor device 200 is configured to detect the relative three-dimensional position of the simulation tool 400 using its magnetic sensors, then simulation exercise process may be simplified, as shown in FIG. 10. At 550, the sensor device 200 detects the start of a simulation. At 552, the sensor device detects the magnetic field 552 from the simulation tool 400, and from this determines the relative position and speed of the tool at 554. At 556, the sensor device 200 transmits a feedback signal as appropriate to the simulation tool 400, which then presents the feedback to the user at 558. This process repeats at steps 560 to 566, and continues until the sensor device 200 determines that the simulation has ended at 568, after which it may transmit the simulation performance data to the communication device 100 at 570. In this example, it can be seen that no data need be sent by the simulation tool 400 to the sensor device 200, which may improve the battery life of the tool 400.

In any of these examples, the sensor device 200, workpiece 300, and simulation tool 400 are three distinct components. If the sensor device 200 is configured to determine the relative position of the tool 400 without additional sensor data from the tool 400, the tool may be completely passive (i.e., not actively generating or collecting data) and may be a simple, inexpensive replica of an actual welding tool; all that is required is that it be provided with a sufficiently powerful magnet for detection by the sensor device 200. Furthermore, since the sensor device 200 is configurable or programmable according to the desired simulation exercise, it can be used with different workpieces and adapted easily for new workpieces and exercises. There is also no need for the workpiece 300 itself to be provided with magnets or other targets to be detected by a sensor, or for the workpiece 300 to be provided with any sensors itself. Further, there is no need for the user to be provided with wearable equipment, as may be required in virtual reality or other simulation systems.

FIGS. 11A to 13B illustrate example simulation workpieces that may be provided for a welding simulation system. These examples are formed of a single US letter (or A4)-sized printed paper sheets, but in some implementations, a differently-sized or shaped sheet may be used depending on the intended size of the simulation workpiece. Indeed, several sheets may be taped, glued, or otherwise fastened together to provide a larger simulation workpiece according to the assembly instructions provided with the workpiece, or a sheet may be cut down to a different size or shape by the user in accordance with assembly instructions. It will also be appreciated by those skilled in the art that the workpieces need not be formed from printed paper, but may be provided on any other type of suitable substrate such as polystyrene or other plastic sheeting. It will be appreciated by those skilled in the art, however, that by forming the simulation workpieces from commonly-available sizes of printer or plotter paper, new workpieces can be easily reproduced at low cost by the user at the user's location using common computer and printing equipment. There is no need for specialized manufacture of workpieces or shipping of specially-designed three-dimensional workpieces to the user's location, or to require the user to attend at a central location to use specially-designed training equipment.

Thus, it will be understood that while the examples of FIGS. 11A to 13B are depicted as being printed on US letter-sized paper, those skilled in the art will appreciate that many variations can be made to the examples to represent different joints or exercises at different scales.

Figures 11A, 11B:
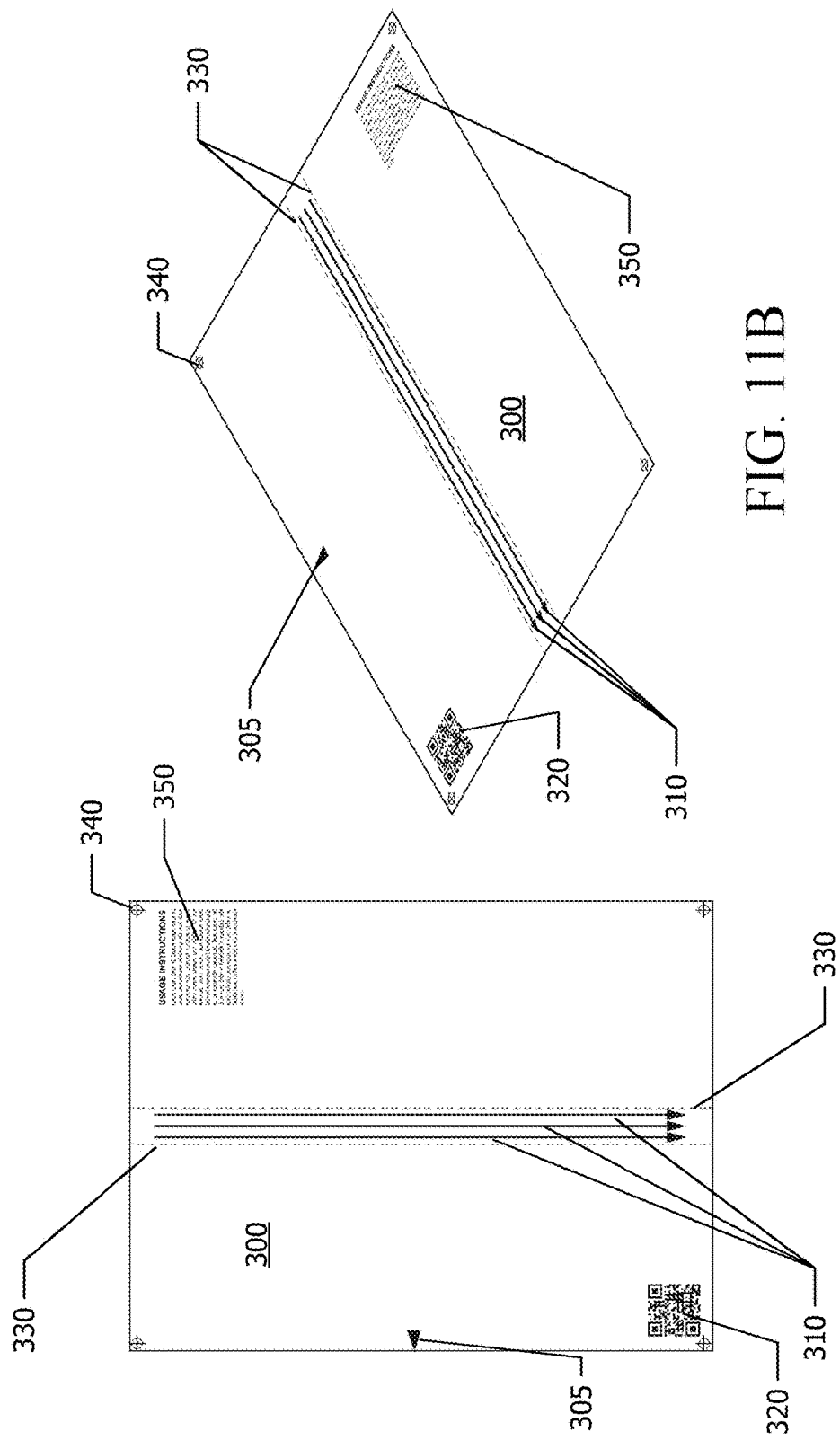
FIGS. 11A and 11B illustrate a first example welding simulation workpiece in a plan view and assembled perspective view, respectively.

FIGS. 11A and 11B depict an example simulation workpiece representing a flat joint. A flat joint—which may be a butt joint or lap joint—is a simple joint to represent by a paper workpiece, since no folding or special assembly is required. Thus, the example workpiece 300 shown in FIGS. 11A and 11B comprises an alignment location 305; a tool path indicator or indicators 310; an association indicium (or multiple indicia) 320; an assembly indicator or indicators 330; calibration marks 340; and instructional content 350. Not all these indicators or markings are required on any of the simulation workpieces; for example, instructional content 350 may be provided separately, or displayed on the user's communication device. The calibration marks 340, used to calibrate readings by the sensor device 340, may be omitted or integrated with other elements of the workpiece (for example, the start or end of a tool path indicator). The indicia 320 permit automatic loading of simulation information, but the user may key in specific information to load a given exercise instead. Finally, in the case of a simple construction such as a flat joint, no assembly indicators may be required. However, including some or all of these indicators or markings enhances the simulation workpiece.

The flat joint of FIGS. 11A and 11B includes tool path indicators 310 that indicate the path to be followed by the working end of the simulation welding tool 400. The example flat joint includes three path indicators 310, representing three passes required to complete the flat joint. Each of the path indicators ends in an arrowhead or is provided with some other indicator to identify the direction of welding. The association indicium 320, calibration marks 340, and alignment location 305 are provided at locations on the workpiece 300 that do not interfere with or obscure the path indicators 310, when possible.

It may be noted that in these examples, the alignment location 305 is disposed at the edge of the sheet comprising the simulation workpiece 300. Depending on the printer used to print the paper or substrate forming the simulation workpiece 300, the printable area of the printer may prevent printing at the edge of the sheet; in that case, any printed indicia, such as an alignment location 305, tool path indicator 310, or other markings, may be printed near the edge of the workpiece, and the unprinted margin of the workpiece may be cut or folded away.

Since the flat joint of FIGS. 11A and 11B represents a relatively flat, and nearly two-dimensional welding surface, no further assembly of the simulation workpiece 300 (shown in plan view in FIG. 11A) is necessary; thus, the assembled version of the simulation workpiece 300 (shown in perspective view in FIG. 11B) is the same as the unassembled version.

FIGS. 12A and 12B illustrate an unassembled (FIG. 12A, plan view) and assembled or shaped (FIG. 12B, perspective view) tee joint simulation workpiece 300. Again, the workpiece 300 includes an alignment location 305; tool path indicators 310; an association indicium 320; assembly indicators 330; calibration marks 340; and instructional content 350, which in this case includes assembly instructions. To form the desired tee joint, the workpiece 300 is folded according to the assembly indicators 330 (which, here, are fold lines) to produce the shaped simulation workpiece representing a tee junction shown in FIG. 12B. The shaped workpiece 300 may be secured in its assembled form by tape or some other adhesive or fastener, as required. It will be appreciated from this example that common printer or copier paper (e.g., with a standard 19 to 28 lb. weight range) is suitable for use in producing the simulation workpiece 300, but other weights and substrates are suitable provided they can be bent, folded, or curved as required to provide the necessary shape, and are sufficiently rigid to maintain the necessary structure. It can be seen that once assembled, the various indicia 305, 320, and 340 may still be visible to the user on the shaped simulation workpiece 300. In particular, the alignment location 305 is still visible, so that the sensor device 200 can be aligned with it. The tool path indicators 310 are still visible so that they can be followed during the simulation exercise.

FIGS. 13A and 13B illustrate an unassembled (left, plan view) and assembled or shaped (right, perspective view) pipe joint simulation workpiece 300. This workpiece 300 also includes an alignment location 305; a tool path indicator 310; an association indicium 320; an assembly indicator 330; calibration marks 340; and instructional content 350, which in this case again includes assembly instructions. In this example, the pipe is assembled by curving the workpiece 300 into a tube, and fastening the tube with tape or another means; the alignment location 305 remains proximate an edge of the assembled simulation workpiece 300, which is positioned so that it can still be aligned with the sensor device 200 when the sensor device 200 is sitting on the same surface as the workpiece 300. Once the workpiece 300 is assembled in its final shape, the tool path indicator 310 circumscribes the shaped workpiece 300 (i.e., a circular path); depending on the shape of the assembled workpiece 300, the tool path may thus change in shape from a straight line segment to a curved line or segment. While the simulation workpiece 300 is lightweight, it can be fixed in place on a work surface using tape or other fastening means, if necessary, to ensure it does not move during a simulation exercise; alternatively, a workpiece 300 may be suspended or mounted in a different orientation in order to simulate a welding operation in a different context. More complex joints may be simulated by joining workpieces, although the size and complexity of the joints may be limited by the strength of the workpiece material.

Since the simulation workpieces 300 can be formed from printed paper, it will be appreciated that new simulation workpieces 300 can be designed and provided to the user without the need for transporting physical materials. It will be appreciated that the user may easily download new simulation workpiece data from a remote computer system (such as the remote system 15) on demand or when available, print them, and assemble them at the user's convenience. In such cases, it is preferably to include a scale reference (not shown in the drawings), such as a square with sides of a defined length (e.g. 5 or 10 cm) so that the user can confirm that workpiece 300 has been printed to the correct dimensions. Alternatively, printed pages comprising unassembled workpieces 300 can be assembled and bound in a book form and distributed in than manner to users; users can remove individual pages from the book and assemble individual workpieces as desired. The book could also further instructional material (e.g., text, diagrams, photographs) on additional pages.

The use of common weight paper to create the simulation workpieces 300 provides a low-cost solution to the problem of providing samples for welding training. Paper workpieces can be easy assembled using scissors and common household glue and/or tape.

Figure 14:
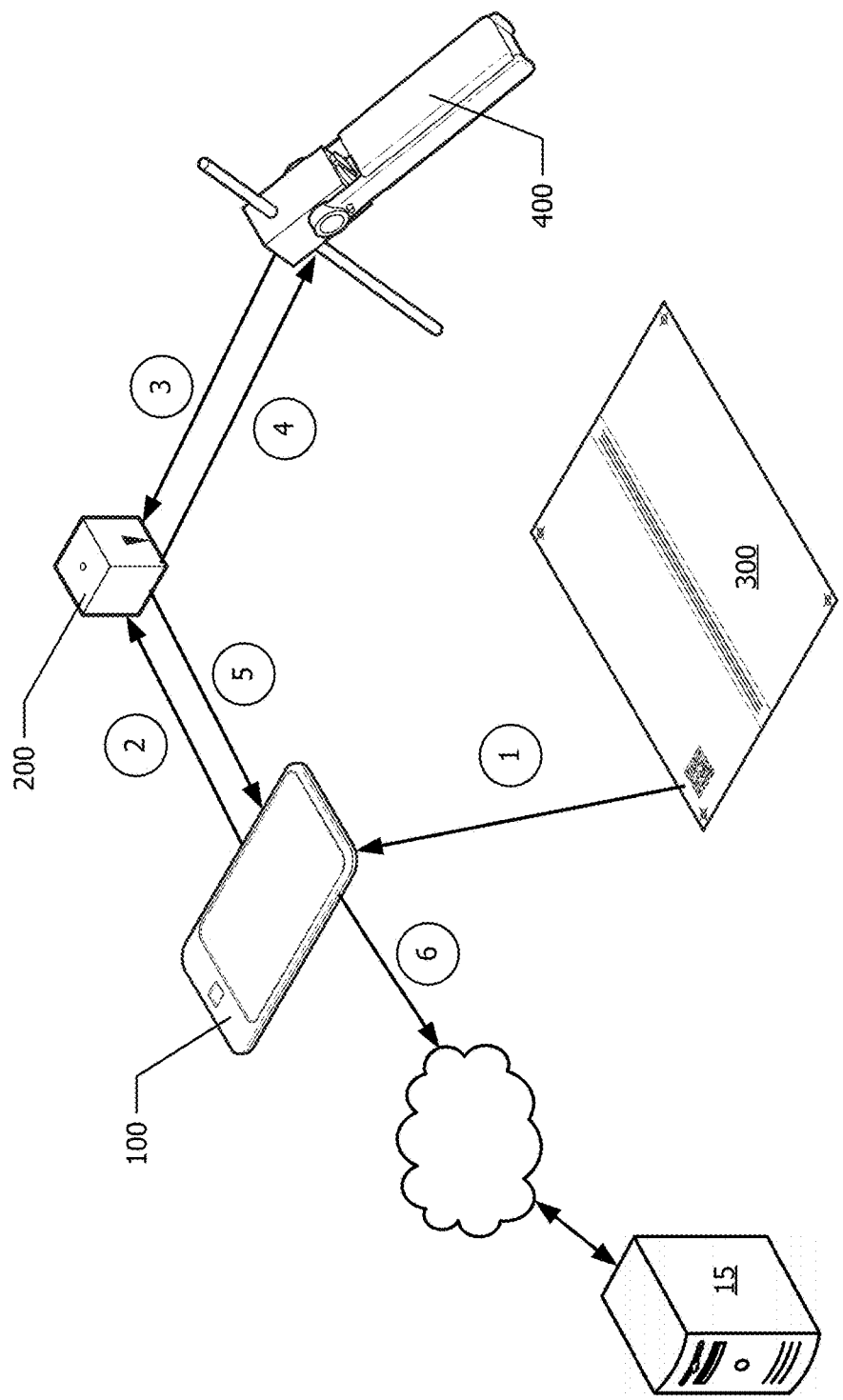
FIGS. 14, 15 and 16 are schematics depicting further overviews of the simulation process according to different embodiments.

The examples were described above primarily with reference to the high-level operational overview illustrated in FIG. 6. However, as mentioned above, the communication flow between various components of the system 10 may vary. FIG. 14 illustrates a variation in which all simulation information for a given exercise is contained in machine-readable form on the simulation workpiece 300, thus eliminating the need for the communication device 100 to retrieve information from a remote computer 15. Thus, in this example, once the simulation workpiece 300 is assembled— or before assembly—the communication device 100 reads the machine-readable indicium or indicia 320 provided on the workpiece 300, and decodes the information represented by the indicia 320 to provide the simulation information. Second, the communication device 100 sends the simulation information to the sensor device 200, once the communication device 100 and sensor device 200 are paired, if required. Third, once the simulation tool 400 and the sensor device 200 are paired, if required, the sensor device 200 detects the magnetic field emanating from the simulation tool 400, and if positional and/or orientation information is generated by the tool, this data is sent from the tool 400 to the sensor device 200. Next, the sensor device generates and transmits a feedback signal to the simulation tool 400, for the simulation tool to present to the user. When the simulation exercise is complete, the sensor device 200 may next transmit the simulation performance data obtained by the sensor device during the exercise to the communication device 100; and sixth, the communication device 100 may optionally, at this point, transmit the data to the remote system 15, or to another remote system, for storage and/or evaluation. This final transmission of data to a remote system is not necessary; the data may instead be retained on the user's communication device 100.

Figure 15:
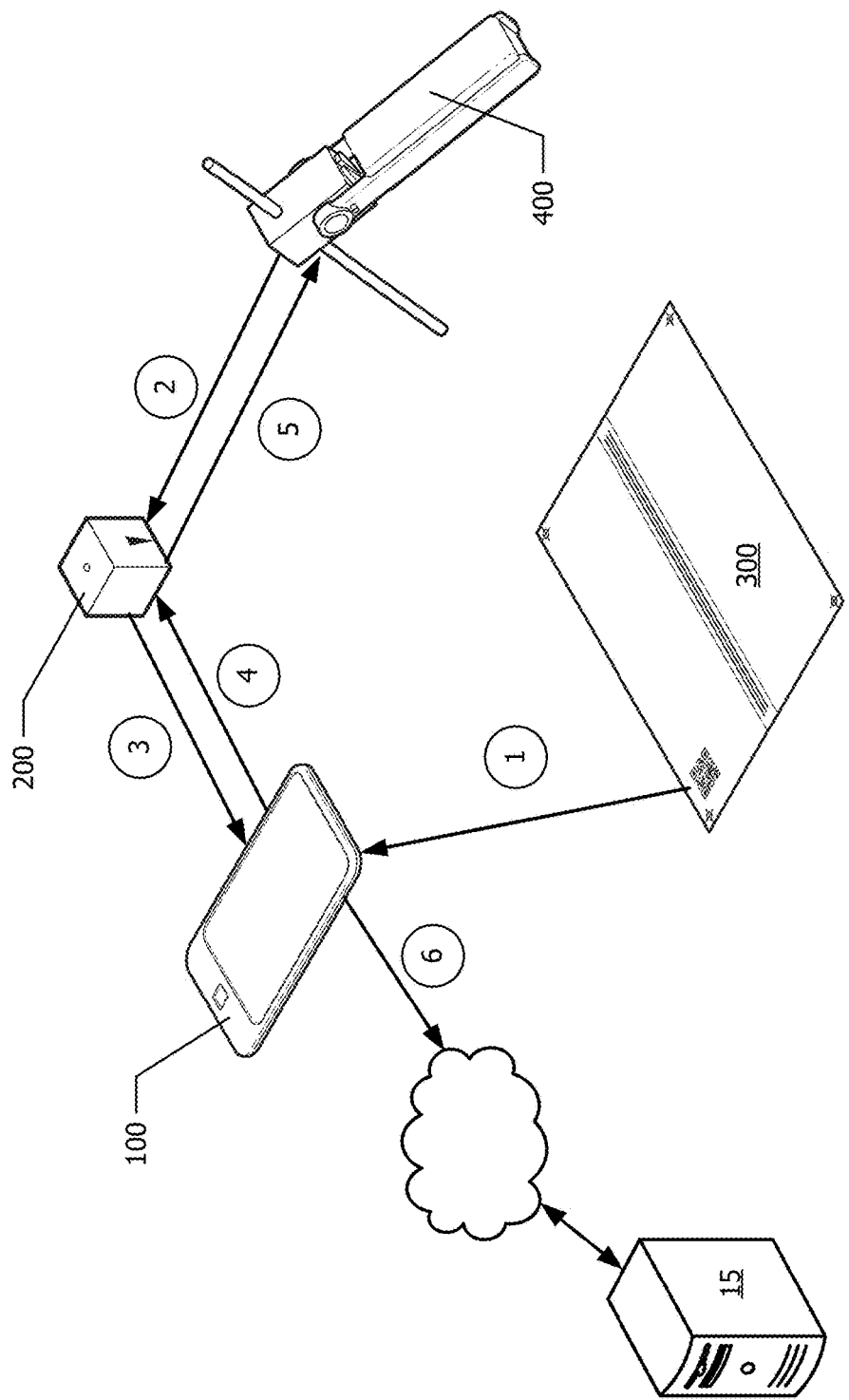

FIG. 15 depicts another communication flow where some of the functionality of the sensor device 200 is transferred to the communication device 100, thereby reducing the need for data processing by the sensor device 200. In this example, the communication device 100 first obtains the simulation information pertinent to the selected simulation exercise, whether as described in FIG. 14 or FIG. 6 above. Once the sensor device 200 and simulation tool 400 are paired, as necessary, and the simulation exercise begins, the sensor device 200 secondly detects the magnetic field from the tool 400 and receives any positional or orientation data from the tool 400; using this data, the sensor device may compute the relative position and speed of the tool 400 with respect to the sensor device 200 or at least the relative distance of the tool 400 from the sensor device, but because the sensor device 200 does not have the simulation information, it cannot determine whether or not the user's movements are within established parameters for the exercise. Instead, the sensor device 200 transmits the position and orientation data to the communication device 100, which then determines whether the movement of the tool 400 is consistent with the simulation information (i.e., whether it is being moved at a position, speed, and/or angle within acceptable tolerances). Fourthly, the communication device 100 sends a feedback signal for the tool 400; this feedback signal may be routed from the communication device 100 to the sensor device 200, and fifthly from the sensor device 200 to the tool 400 for display to the user. Finally, when the communication device 100 determines that the simulation exercise has ended, the device 100 may optionally send the simulation performance data to a remote system 15.

Figure 16:
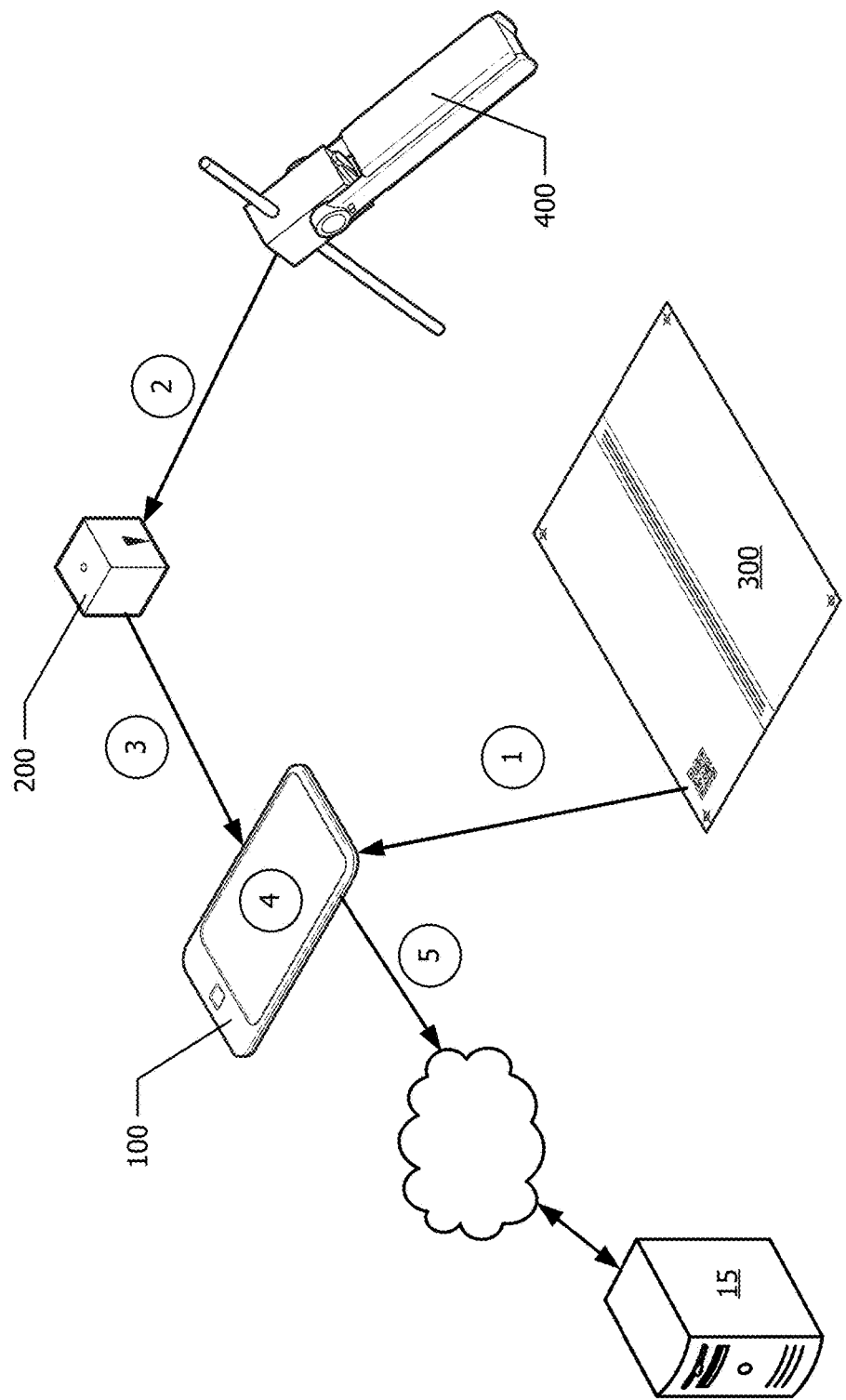

Yet another variant is shown in FIG. 16, in which the functions of the sensor device 200 and simulation tool 400 are further reduced. In this example, the user's communication device 100 generates and presents the feedback to the user, without the need to transmit a feedback signal to the tool 400. Thus, first, the communication device 100 obtains the simulation information pertinent to the selected simulation exercise, whether as described in FIG. 14 or FIG. 6 above. Once the sensor device 200 and simulation tool 400 are paired, as necessary, and the simulation exercise begins, the sensor device 200 secondly detects the magnetic field from the tool 400 and receives any positional or orientation data from the tool 400. No pairing between the tool 400 and sensor device 200 may be necessary if sufficient positional information can be acquired by the magnetic sensors on the sensor device 200. Thirdly, the sensor device may compute the relative position and speed of the tool 400 with respect to the sensor device 200 or at least the relative distance of the tool 400 from the sensor device, but then transmits the position and orientation data to the communication device 100. The communication device 100 fourthly determines whether the movement of the tool 400 is consistent with the simulation information, then generates and displays or sounds a feedback signal for the user. The feedback signal may be a change in the display or an LED on the communication device 100, but usefully the feedback may be an audible signal that instructs the user how to correct their movement, if necessary. Fifthly, when the simulation exercise has ended, the communication device 100 may optionally send the simulation performance data to a remote system 15. Thus, in this example, the tool 400 may not only be completely passive, if no positional or orientation data is transmitted from the tool 400 to the sensor device; the tool may not require any receiver or processor for handling a feedback signal.

Figure 17A:
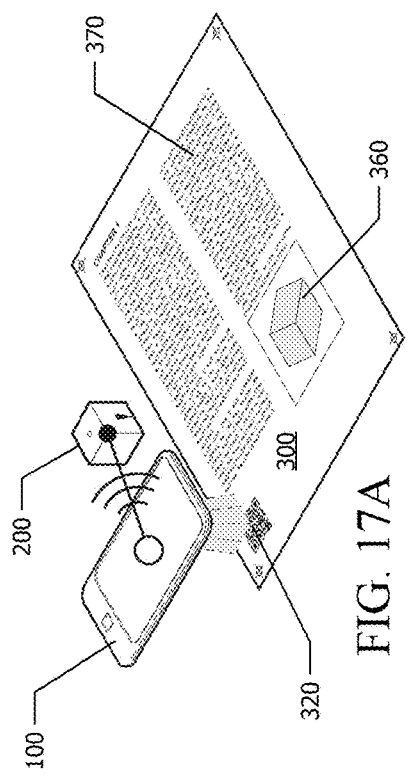
Figure 17B:
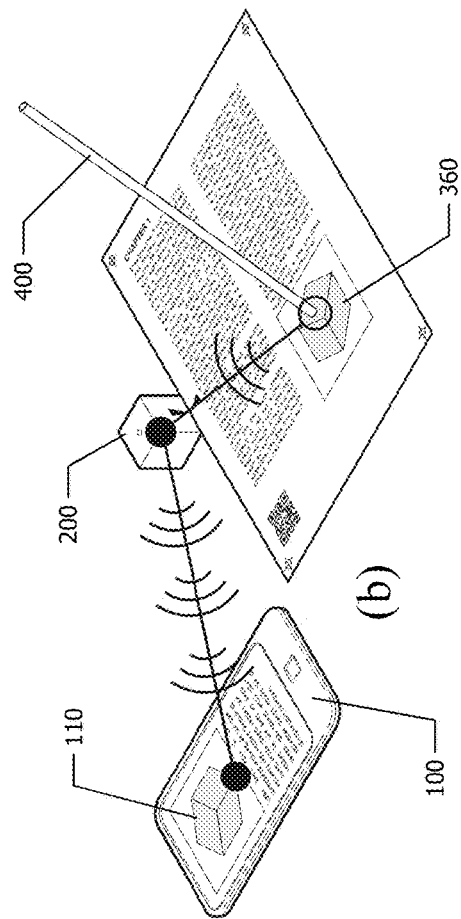

Components of the system 10 may be used to load ancillary content related to printed content onto the communication device 100. FIGS. 17A and 17B illustrate a page of printed information 300, which may be combined with a simulation workpiece (simulation workpiece elements not shown in this drawing), or else printed separately from a simulation workpiece. This example includes text information 370 and graphic or photographic information 360. The communication device 100 may be paired with the sensor device 200 as necessary, and used to read the machine-readable indicium 320 as described above, as shown in FIG. 17A.

As shown in FIG. 17B, the sensor device 200 and the printed page 300 are aligned using their respective alignment indicators. A simulation tool 400 may be used to select a particular element on the page, such as the information 360. The sensor device 200 detects the relative position of the tool 400 on the page 300, generally as described above. This position information is provided by the sensor device 200 to the communication device 100, which uses the position information and information from the indicium 320 to identify and retrieve ancillary content 110, which it may then display.

FIGS. 18A and 18B illustrate a further variant in which additional content 120 is loaded onto the communication device 100. As shown in FIG. 18A, the communication device 100 is again used to read the machine-readable indicium 320 as described above. The page of printed information 300 in this example includes diagrams, such as blueprints, including a graphic element 380. As shown in FIG. 18B, the tool 400 can be used to select the element 380. The sensor device 200 detects the relative position of the tool 400 on the page 300, and sends this information to the communication device 100. The communication device 100 again uses the position information and information from the indicium 320 to identify and retrieve ancillary content 111 for display.

In some implementations, the flexibility of the simulation system 10 may be enhanced by using a multi-mode simulation tool, such as the example tool 400 illustrated in FIGS. 19 to 24A. In the example shown in these figures, the example tool 400 is adaptable with accessories for shielded metal arc (or "stick") welding (SMAW), gas tungsten arc welding (GTAW), and gas metal arc welding (GMAW) while retaining the same handle. The example tool, as illustrated in FIGS. 19 and 20, includes a handle component 460, an attachment block 450, and an accessory component 470, which is removably mounted on the attachment block 450. The attachment block 450 is pivotably mounted on the handle 460, and in order to provide the number of variations as illustrated in the accompanying figures, the attachment block 450 is removable and repositionable as necessary on the handle 460. The handle component 460, attachment block 450, and accessory component 470 can be sized and weighted as required to provide the appropriate heft to generally resemble a real welding tool. However, as discussed below, the attachment block 450 provides a mechanism for attaching different welding accessories at the appropriate angles relative to the handle 460 to provide a multi-purpose, but low-cost, simulation tool.

As can be seen in the example of FIG. 20, the attachment block 450 has several faces with various protrusions and recesses for engaging the other components of the tool 400, and to enable the attachment block 450 to be fixed in one position with respect to the handle 460 in order to simulate the structure of a given welding tool. In this example, the attachment block 450 is generally rectangular in shape, but those skilled in the art will appreciate that any convenient and suitable shape and means of engagement with other components may be employed. This example attachment block 450 includes trunnions on a first set of opposing faces of the block 450, for engaging in corresponding trunnion openings 462 in a yoke or bracket on the handle 460. The attachment block 450, once mounted on the handle 460 by these means, can rotate between at least two angular positions with respect to the axis of the handle, as will be better understood by comparing the position of the attachment block 450 relative to the handle 460 in FIGS. 22 and 23, discussed in further detail below. Indeed, depending on the design, the attachment block 450 may be able to rotate freely (i.e., around 360°) while pivotably mounted to the handle 460, to facilitate positioning of the attachment block 450 in the correct position for a selected welding tool type. However, if the attachment block is removable and repositionable on the handle in the required positions for each welding tool type, there may be no need to provide a pivotable mounting means for the attachment block.

When the attachment block 450 is in place on the handle and in a desired position for a given welding tool type, the attachment block 450 can be held in place with respect to the handle using a fastener, clip, or ratcheting mechanism. In the illustrated examples, one or more transverse bores 458*a*, 458*b*, 468*c* corresponding to the positions for different welding tool points extend through the body of the attachment block 450, between the same opposing faces bearing the trunnions 456. Corresponding bores 464 are provided in the yoke of the handle, such that a retaining pin 466 can pass through the bores 464 and an aligned bore 458*a, b,* or *c* to retain the attachment block 450 in fixed relation to the handle 460. The pin 466 may take the form of a clevis pin and be held in place with a cotter pin. The pin 466 can then be easily removed and the attachment block 450 rotated to a different position so that a different bore 458*a*, *b*, or *c* aligns with the handle bores 464.

The attachment block 450 includes one or more mounts 452, 453 and a bore 454 for mounting a welding accessory 470 thereto, likely on different faces of the attachment block 450 according to the welding tool type. Three example welding accessories are shown in FIGS. 21A, 21B, and 21C. FIG. 21A depicts a SMAW tool head accessory 470*a*, which simulates the shielded core wire; FIG. 21B depicts a GTAW tool head accessory; and FIG. 21C depicts a GMAW tool head accessory.

As shown in FIGS. 22 and 22A, which is a detail view of circle a in FIG. 22, the SMAW tool head accessory 470*a* is mounted to the attachment block 450 by insertion in the bore 454, which extends through the body of the attachment block 450 between a second pair of opposing faces of the block 450. The block 450 is positioned so that the transverse bore 458*a* aligns with the corresponding bore 464 in the handle, and the retaining pin 466 is used to hold the attachment block 450 in place, as indicated in FIG. 22. Accessory 470*a* mates with the bore 454 in a loose fit such that as the electrode of an SMAW tool is gradually consumed by welding, the relative length of the accessory 470*a* emerging from the bore 454 towards the workpiece can be altered by sliding the accessory 470*a* through the bore. The magnet required for generating the magnetic field detectable by the sensor device 200 can be provided at the working end 407 of the accessory 470*a*.

The GTAW tool head accessory 470*b*, as shown in FIG. 23 and in FIG. 23A, which is a detail view of circle b in FIG. 23, includes a gas cap end 474 and a collet portion 472 representing the gas nozzle. The magnet, again, can be provided at the gas cup 407 simulated on the collet portion 472. The gas cap includes a threaded end that is inserted into the same bore 454 used to retain the SMAW accessory 470*a*, which is received by a corresponding threaded bore within the collet portion 472. To retain the accessory 470*b* at the correct angle with respect to the handle, the accessory block 450 is rotated until the second bore 458*b* aligns with the handle bores 464, then retained in place with the pin 466.

Finally, FIG. 24 and FIG. 24A, which is a detail view of circle c in FIG. 24, show the assembly of the GMAW tool head accessory 470*c* on the attachment block 450. In this example, the accessory 470*c*, which resembles the conductor tube of a GMAW tool, ends with a nozzle and contact tip 407, where again, the magnet may be located. The accessory 470*c* in this example is mounted to a threaded mount on an end face of the attachment block 450 orthogonal to both the first and second pairs of opposing faces, and the magnet can be mounted to the contact tip location at 407. To hold the accessory 470*c* at the correct angle with respect to the handle 460, the attachment block 450 is rotated so that the third transverse bore 458*c* is aligned with the handle bores 464, and held in alignment by the retaining pin 466.

Because the tool head accessories are interchangeable on the same handle and accessory block, a flexible simulation system can be provided at lower cost than a system requiring individual tools for each type of weld. The laser distance sensor 415 can be positioned on the attachment block 450 in a position generally facing the workpiece 300. The orientation sensor 420 may be positioned in the handle 460 along with any other circuitry of in the tool 400. Any required wiring can extend between the attachment block 450 and the handle 460 in a manner that does not interfere with the position of the attachment block 450.

While the examples described above are directed primarily to welding, it will be appreciated that the simulation systems, methods, and techniques may be adaptable to other fabrication or construction skills, such as the application of coatings and adhesives, other fabrication techniques, such as riveting and spot welding, and non-destructive testing. In such applications, the tool 400 would then simulate an application device, sensor, or other tool, and the simulation workpiece 300 would represent a suitable surface. It will also be understood that while the examples given above contemplated that the tool would follow a continuous path as indicated on the workpiece 300, this is not necessary; the path followed by the tool may be a discontinuous path or separate points to be welded, measured, or fastened in a specified order, as in the case of spot welding.

The foregoing embodiments and examples thus provide a simulator system for use in simulating fabrication or construction, comprising: a simulation tool comprising a magnet mounted in fixed relation to a working end of the simulation tool; a simulation workpiece comprising a substrate having an alignment location provided thereon, and at least one tool path indicator; and a sensor device, comprising: an alignment location on an exterior of the sensor device; at least one magnetic sensor, memory, and a microprocessor in communication with the at least one magnetic sensor and the memory, configured to detect a magnetic field from the simulation tool from the simulation tool and to determine a path travelled by the simulation tool with respect to the sensor device, when the alignment location of the sensor device is aligned with the alignment location of the simulation workpiece.

In one aspect, the simulation workpiece further comprises at least one assembly indicator on the substrate, wherein the substrate is capable of being curved, bent, or folded according to the at least one assembly indicator to provide a shaped simulation workpiece such that the at least one tool path indicator is visible on the shaped simulation workpiece.

In another aspect, the substrate is paper.

In a further aspect, the sensor device further comprises a wireless communications system in communication with the microprocessor; the simulation workpiece further comprises at least one machine-readable indicium associating the simulation workpiece with a simulation exercise, the at least one machine-readable indicium being readable by a user communication device; and the sensor device is further configured to receive, from the user communication device, simulation performance data for a simulation exercise obtained by the user communication device in response to reading the at least one machine-readable indicium, the simulation performance data comprising at least path information for the simulation tool.

In a further aspect, the sensor device is further configured to determine whether the path travelled by the simulation tool is consistent with the simulation performance data.

In a further aspect, the sensor device is further configured to provide feedback responsive to whether the path travelled by the simulation tool is consistent with the simulation performance data.

In a further aspect, the simulation workpiece is a welding simulation workpiece and the tool path indicator comprises a welding path indicator.

In a further aspect, the simulation tool simulates at least one of a shielded metal arc welding accessory, a gas tungsten arc welding accessory, or a gas metal arc welding accessory.

In a further aspect, the simulation tool comprises: a handle; an attachment block mountable in different positions on the handle; and a welding accessory mountable to the attachment block, wherein the attachment block is mountable at a defined rotational position with respect to the handle according to a type of welding accessory mounted to the attachment block.

In a further aspect, the attachment block is pivotably mounted on the handle and is rotatable between at least two positions for mounting at least two different welding accessories.

There is also provided a simulation method, comprising: providing a simulation workpiece comprising a substrate having an alignment location provided thereon, and at least one at least one tool path indicator; aligning the alignment location of the simulation workpiece with an alignment location provided on an exterior of a sensor device, the sensor device comprising at least one magnetic sensor, memory, and a microprocessor in communication with the at least one magnetic sensor and the memory; moving a simulation tool in response to the at least one tool path indicator, the simulation tool comprising a magnet mounted in fixed relation to a working end of the simulation tool, the sensor device detecting the magnetic field from the simulation tool and determining a path travelled by the simulation tool with respect to the sensor device.

In one aspect, the simulation is a welding simulation and the tool path indicator comprises a welding path indicator.

In a further aspect, the simulation workpiece further comprises at least one assembly indicator on the substrate, the method further comprising curving, bending, or folding the substrate according to the at least one assembly indicator to provide a shaped simulation workpiece such that the at least one tool path indicator is visible on the shaped simulation workpiece.

In a further aspect, the substrate of the simulation workpiece is paper.

There is also provided a simulation method implemented in a simulator system, the simulator system comprising: a sensor device comprising an alignment location on an exterior of the sensor device; and at least one magnetic sensor, memory, and a microprocessor in communication with the at least one magnetic sensor and the memory, configured to detect a magnetic field from the simulation tool from the simulation tool and to determine a path travelled by the simulation tool with respect to the sensor device; a simulation tool comprising a magnet mounted in fixed relation to a working end of the simulation tool; and a simulation workpiece comprising a substrate having an alignment location provided thereon, and at least one at least one tool path indicator, the method comprising: when the alignment location of the sensor device is aligned with the alignment location of the simulation workpiece, detecting, using the at least one magnetic sensor, a moving magnetic field generated by the simulation tool; determining, by the sensor device, the path travelled by the simulation tool with respect to the sensor device; comparing the path to simulation performance data for a simulation exercise; providing feedback dependent on the comparison of the path to the simulation performance data for the simulation exercise.

In one aspect, the simulation workpiece comprises at least one machine-readable indicium associating the simulation workpiece with the simulation exercise, the method further comprises: the sensor device obtaining the simulation performance data in response to reading the at least one machine-readable indicium.

In a further aspect, the method further comprises reading the at least one machine-readable indicium to obtain a simulation exercise identifier; and using the simulation exercise identifier to retrieve the simulation performance data.

In a further aspect, a user communication device reads the at least one machine-readable indicium and retrieves the simulation performance data, and wherein the sensor device further comprises a wireless communications system, the method further comprising the user communication device sending the simulation performance data to the sensor device via the wireless communications system.

In a further aspect, the simulation workpiece further comprises at least one assembly indicator on the substrate, the method further comprising curving, bending, or folding the substrate according to the at least one assembly indicator to provide a shaped simulation workpiece such that the at least one tool path indicator is visible on the shaped simulation workpiece.

In a further aspect, the substrate of the simulation workpiece is paper.

There is also provided a simulation workpiece for use in a welding simulator system, the simulation workpiece comprising: a substrate; an alignment location on the substrate for use in alignment with a separate sensor unit of the welding simulator system; and at least one welding path indicator; and at least one machine-readable indicium readable by a component of the welding simulator system to associate the simulation workpiece with a simulation exercise.

In one aspect, the simulation workpiece further comprise at least one assembly indicator on the substrate, wherein the substrate is capable of being curved, bent, or folded according to the at least one assembly indicator to provide a shaped simulation workpiece such that the at least one welding path indicator is visible on the shaped simulation workpiece.

In a further aspect, the substrate is bent or folded to provide a tee joint simulation workpiece.

In a further aspect, the substrate is curved to provide a pipe joint simulation workpiece.

In a further aspect, the alignment location is printed on the substrate.

In a further aspect, the alignment location is proximate to an edge of the workpiece.

In a further aspect, the at least one welding path indicator and alignment location is printed on the substrate.

In a further aspect, the alignment location comprises a single indicator.

In a further aspect, the at least one indicium comprises an optical, machine-readable indicium.

In a further aspect, the substrate is paper.

In a further aspect, the at least one machine-readable indicium comprises simulation performance data for the simulation exercise, the simulation performance data comprising at least path information for a simulation tool.

In a further aspect, the at least one machine-readable indicium comprises address information for directing a communications device to retrieve simulation performance data for the simulation exercise, the simulation performance data comprising at least path information for a simulation tool.

There is also provided a printed substrate providing a simulation workpiece, the printed substrate comprising: a substrate; at least one sensor alignment mark printed on the substrate; at least one tool path indicator printed on the substrate; and zero, one or more assembly indicators printed on the substrate, wherein the substrate is curvable, bendable or foldable according to the one or more assembly indicators, if provided, to produce a shaped simulation workpiece.

In one aspect, the printed substrate comprises one or more assembly indicators printed on the substrate.

In another aspect, the at least one tool path indicator is visible on the shaped simulation workpiece.

In a further aspect, the one or more assembly indicators comprise at least one fold line.

In a further aspect, the one or more assembly indicators comprise at least one fastening location.

In a further aspect, the substrate is bendable or foldable to provide a tee joint simulation workpiece.

In a further aspect, the substrate is curvable or foldable to provide a pipe joint.

In a further aspect, the at least one sensor alignment mark is printed proximate to an edge of the substrate.

In a further aspect, the printed substrate further comprises at least one machine-readable indicium associating the printed substrate with a simulation exercise.

In a further aspect, the at least one machine-readable indicium comprises simulation performance data for the simulation exercise, the simulation performance data comprising at least path information for a simulation tool.

In a further aspect, the at least one machine-readable indicium comprises address information for directing a communications device to retrieve simulation performance data for the simulation exercise, the simulation performance data comprising at least path information for a simulation tool.

In a further aspect, the simulation workpiece is a welding simulation workpiece.

In a further aspect, the substrate is a sheet of paper.

There is also provided a set of printed substrates as described above, bound in a form of a book. Each substrate may be separately removable from the book.

There is also provided a method of delivering a simulation workpiece for use in a tool simulation exercise, the method comprising: transmitting a digital representation of the printed substrate as described above to a recipient electronic device for printing by a printer.

There is further provided a method of producing a simulation workpiece for use in a tool simulation exercise, the method comprising: receiving, at an electronic device, a digital representation of the printed substrate as described above; and printing the digital representation on a substrate.

In one aspect, the digital representation of the printed substrate includes one or more assembly indicators, the method further comprising assembling a shaped simulation workpiece using the one or more assembly indicators.

There is also provided a sensor device for use in a fabrication or construction simulation, the sensor device comprising: an alignment location on an exterior of the sensor device, for aligning the sensor device with a simulation workpiece; at least one wireless communications system; at least one magnetic sensor; a memory device; and a microprocessor in communication with the memory, the wireless communications system and at least one magnetic sensor, configured to: store simulation performance data for a simulation exercise, the simulation performance data comprising at least path information for a simulation tool; detect, using the at least one magnetic sensor, a magnetic field from the simulation tool; and determine, using information about the detected magnetic field, a path travelled by the simulation tool with respect to the sensor device.

In one aspect, the microprocessor is further configured to determine whether the path is consistent with the simulation performance data.

In a further aspect, the microprocessor is further configured to generate a feedback signal in dependence on whether the path travelled by the simulation tool is consistent with the simulation performance data.

In a further aspect, the microprocessor is further configured to send the feedback signal to the simulation tool using the at least one wireless communications system.

In a further aspect, the at least one wireless communications system comprises a Bluetooth transmitter.

In a further aspect, the microprocessor is configured to detect the magnetic field from the simulation tool while it is moved by a user along a path indicated by a tool path indicator provided on the simulation workpiece.

In a further aspect, the microprocessor is configured to receive the simulation performance data from a remote device using the at least one wireless communications system.

In a further aspect, the remote device is a handheld communications device.

In a further aspect, the sensor device is further configured to: measure linear distances between the sensor device and a magnet provided on the simulation tool, using the at least one magnetic sensor; receive from the simulation tool, using the at least one wireless communications system, orientation sensor values and a linear distance value representing a distance between the simulation tool and the simulation workpiece; and compute the path travelled by the simulation tool using the linear distances and the received values.

In a further aspect, the sensor device comprises a plurality of magnetic sensors, and is further configured to determine three-dimensional positions of the simulation tool relative to the sensor device for computing the path travelled by the simulation tool.

In a further aspect, the sensor device is further configured to determine whether an orientation of the simulation tool is consistent with the simulation performance data, and to generate a feedback signal in dependence on whether the orientation of the simulation tool is consistent with the simulation performance data.

There is also provided a welding simulator system, comprising: the simulation workpiece as described above; a simulation tool comprising a magnet mounted in fixed relation to a working end of the simulation tool; and the sensor device as described above.

There is also provided a welding simulator system, comprising the simulation workpiece as described above; a sensor device as described above; and a welding simulation tool, comprising: a magnet mounted in fixed relation to a working end of the simulation tool; an orientation sensor device; a distance sensor device; and a wireless transmitter.

There is also provided a welding simulator system, comprising: the simulation workpiece as described above; a sensor device as described above; and a welding simulation tool, comprising a magnet mounted in fixed relation to a working end of the simulation tool.

In one aspect, the magnet is an electromagnet.

There is also provided a welding simulation method, using the welding simulator system as described above, the method comprising: aligning the alignment location of the simulation workpiece with the alignment location of the sensor device; loading simulation performance data for a simulation exercise associated with the simulation workpiece; moving the simulation tool in response to the at least one welding path indicator; and using the sensor device to determine a path travelled by the simulation tool with respect to the sensor device.

In one aspect, welding simulation method further comprises: determining whether the path travelled by the simulation tool is consistent with the simulation performance data; and generating a feedback signal in dependence on whether the path travelled by the simulation tool is consistent with the simulation performance data.

In a further aspect, the determining is carried out by the sensor device.

In a further aspect, loading the simulation performance data comprises: reading the at least one machine-readable indicium to obtain a simulation exercise identifier; using the simulation exercise identifier to retrieve the simulation performance data.

In a further aspect, the reading is carried out by a communication device, and using the simulation exercise identifier to retrieve the simulation performance data comprises: the communication device obtaining the simulation performance data from a remote computer system; and the communication device transmitting the simulation performance data to the sensor device.

In a further aspect, loading the simulation performance data occurs before the aligning.

In a further aspect, the method further comprises using the at least one assembly indicator to provide a shaped simulation workpiece, and wherein aligning the alignment location of the simulation workpiece with the alignment location of the sensor device comprises aligning the alignment location of the shaped simulation workpiece with the alignment location of the simulation workpiece.

There is also provided a welding simulation tool, comprising: a handle; an attachment block mountable in different positions on the handle; and a welding accessory mountable to the attachment block, wherein the attachment block is mountable at a defined rotational position with respect to the handle according to a type of welding accessory mounted to the attachment block.

In one aspect, the attachment block is pivotably mounted on the handle.

In a further aspect, the attachment block is rotatable between at least two positions for mounting at least two different welding accessories.

In a further aspect, the welding accessory comprises one of a shielded metal arc welding accessory, a gas tungsten arc welding accessory, or a gas metal arc welding accessory.

In a further aspect, the at least two different welding accessories are selected from a shielded metal arc welding accessory, a gas tungsten arc welding accessory, and a gas metal arc welding accessory.

In a further aspect, the tool further comprises a magnetic target for generating a magnetic field to be detected by a separate sensor device.

In a further aspect, the magnetic target is provided on the welding accessory.

There is also provided a kit for a welding simulation tool, comprising: a handle; an attachment block mountable in different positions on the handle; and a set of one or more welding accessories mountable to the attachment block, wherein the attachment block is fixable at a defined rotational position with respect to the handle according to a type of welding accessory to be mounted to the attachment block.

In one aspect, the attachment block is pivotably mounted on the handle.

In a further aspect, the kit comprises a set of at least two different welding accessories, and wherein the attachment block is rotatable between at least two positions, each for mounting a corresponding one of the at least two different welding accessories.

In a further aspect, the set of one or more welding accessories comprises at least one of a shielded metal arc welding accessory, a gas tungsten arc welding accessory, or a gas metal arc welding accessory.

In a further aspect, the set of one or more welding accessories comprises at least two of a shielded metal arc welding accessory, a gas tungsten arc welding accessory, and a gas metal arc welding accessory.

In a further aspect, the set of one or more welding accessories comprises a shielded metal arc welding accessory, a gas tungsten arc welding accessory, and a gas metal arc welding accessory.

In a further aspect, the kit comprises a magnetic target for generating a magnetic field to be detected by a separate sensor device.

In a further aspect, the magnetic target is provided on each welding accessory.

The examples and embodiments are presented only by way of example and are not meant to limit the scope of the subject matter described herein. Variations of these examples and embodiments will be apparent to those in the art, and are considered to be within the scope of the subject matter described herein. For example, some steps or acts in a process or method may be reordered or omitted, and features and aspects described in respect of one embodiment may be incorporated into other described embodiments.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object (as in an object-oriented paradigm), applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Throughout the specification, terms such as "may" and "can" are used interchangeably. Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A simulator system for use in simulating fabrication or construction, comprising:
   a simulation tool comprising a magnet mounted in fixed relation to a working end of the simulation tool;
   a simulation workpiece comprising a substrate having a visible alignment indicator provided thereon, and at least one tool path indicator; and
   a sensor device, comprising:
      a visible alignment indicator on an exterior of the sensor device;
      at least one magnetic sensor, memory, and a microprocessor in communication with the at least one magnetic sensor and the memory, configured to detect a magnetic field from the simulation tool and to determine a path travelled by the simulation tool with respect to the sensor device, while the visible alignment indicator of the sensor device is maintained in physical alignment with the visible alignment indicator of the simulation workpiece.

2. The simulator system of claim 1, wherein the simulation workpiece further comprises at least one assembly indicator on the substrate, wherein the substrate is capable of being curved, bent, or folded according to the at least one assembly indicator to provide a shaped simulation workpiece such that the at least one tool path indicator is visible on the shaped simulation workpiece.

3. The simulator system of claim 2, wherein the substrate is paper.

4. The simulator system of claim 1, wherein:
   the sensor device further comprises a wireless communications system in communication with the microprocessor;
   the simulation workpiece further comprises at least one machine-readable indicium associating the simulation workpiece with a simulation exercise, the at least one machine-readable indicium being readable by a user communication device; and
   the sensor device is further configured to receive, from the user communication device, simulation performance data for the simulation exercise obtained by the user communication device in response to reading the at least one machine-readable indicium, the simulation performance data comprising at least path information for the simulation tool, wherein the path information defines a path to be followed by the simulation tool during performance of the simulation exercise.

5. The simulator system of claim 4, wherein the sensor device is further configured to determine whether the path travelled by the simulation tool is consistent with the simulation performance data.

6. The simulator system of claim 5, wherein the sensor device is further configured to provide feedback responsive to whether the path travelled by the simulation tool is consistent with the simulation performance data.

7. The simulator system of claim 1, wherein the simulation workpiece is a welding simulation workpiece and the at least one tool path indicator comprises a welding path indicator.

8. The simulator system of claim 7, wherein the simulation tool simulates at least one of a shielded metal arc welding accessory, a gas tungsten arc welding accessory, or a gas metal arc welding accessory.

9. The simulator system of claim 8, wherein the simulation tool comprises:
   a handle;
   an attachment block mountable in different positions on the handle; and
   a welding accessory mountable to the attachment block, wherein the attachment block is mountable at a defined rotational position with respect to the handle according to a type of welding accessory mounted to the attachment block.

10. The simulator system of claim 9, wherein the attachment block is pivotably mounted on the handle and is rotatable between at least two positions for mounting at least two different welding accessories.

11. The simulator system of claim 9, wherein the tool further comprises a feedback indicator proximate to a working end of the welding accessory.

12. The simulator system of claim 11, wherein the feedback indicator is a light-emitting diode.

13. A simulation method, comprising:
   providing a simulation workpiece comprising a substrate having one or more visible alignment indicators provided thereon, and at least one tool path indicator;
   aligning the one or more visible alignment indicators of the simulation workpiece with a sensor device, the sensor device comprising at least one magnetic sensor, memory, and a microprocessor in communication with the at least one magnetic sensor and the memory;
   moving a simulation tool in response to the at least one tool path indicator while the sensor device continues to be aligned with the one or more visible alignment indicators of the simulation workpiece, the simulation tool comprising a magnet mounted in fixed relation to a working end of the simulation tool, the sensor device detecting the magnetic field from the simulation tool and determining a path travelled by the simulation tool with respect to the sensor device.

14. The simulation method of claim 13, wherein the simulation method is a welding simulation method and the at least one tool path indicator comprises a welding path indicator.

15. The simulation method of claim 13, wherein the simulation workpiece further comprises at least one assembly indicator on the substrate, the simulation method further comprising curving, bending, or folding the substrate according to the at least one assembly indicator to provide a shaped simulation workpiece such that the at least one tool path indicator is visible on the shaped simulation workpiece.

16. The simulation method of claim 15, wherein the substrate of the simulation workpiece is paper.

17. A simulation method implemented in a simulator system having a sensor device comprising a visible alignment indicator on an exterior of the sensor device; and at least one magnetic sensor, memory, and a microprocessor in communication with the at least one magnetic sensor and the memory, configured to detect a magnetic field from a simulation tool and to determine a path travelled by the simulation tool with respect to the sensor device; the simulation tool comprising a magnet mounted in fixed relation to a working end of the simulation tool; and a simulation workpiece comprising a substrate having a visible alignment indicator provided thereon, and at least one tool path indicator, the simulation method comprising:
physically aligning the visible alignment indicator of the sensor device with the visible alignment indicator of the simulation workpiece;
detecting, using the at least one magnetic sensor, a moving magnetic field generated by the simulation tool as the simulation tool is moved with respect to the simulation workpiece while the visible alignment indicator of the sensor device continues to be physically aligned with the visible alignment indicator of the simulation workpiece;
determining, by the sensor device, the path travelled by the simulation tool with respect to the sensor device;
comparing the path to simulation performance data for a simulation exercise;
providing feedback dependent on the comparing of the path to the simulation performance data for the simulation exercise.

18. The simulation method of claim 17, wherein the simulation workpiece comprises at least one machine-readable indicium associating the simulation workpiece with the simulation exercise, the simulation method further comprising:

the sensor device obtaining the simulation performance data in response to reading the at least one machine-readable indicium.

19. The simulation method of claim 18, further comprising:
reading the at least one machine-readable indicium to obtain a simulation exercise identifier; and
using the simulation exercise identifier to retrieve the simulation performance data.

20. The simulation method of claim 19, wherein a user communication device reads the at least one machine-readable indicium and retrieves the simulation performance data, and wherein the sensor device further comprises a wireless communications system, the method further comprising the user communication device sending the simulation performance data to the sensor device via the wireless communications system.

21. The simulation method of claim 17, wherein the simulation workpiece further comprises at least one assembly indicator on the substrate, the simulation method further comprising curving, bending, or folding the substrate according to the at least one assembly indicator to provide a shaped simulation workpiece such that the at least one tool path indicator is visible on the shaped simulation workpiece.

22. The simulation method of claim 21, wherein the substrate of the simulation workpiece is paper.

* * * * *